(12) United States Patent
Sarukkai et al.

(10) Patent No.: US 11,710,251 B2
(45) Date of Patent: Jul. 25, 2023

(54) DEEP DIRECT LOCALIZATION FROM GROUND IMAGERY AND LOCATION READINGS

(71) Applicant: Lyft, Inc., San Francisco, CA (US)

(72) Inventors: Ramesh Rangarajan Sarukkai, Los Gatos, CA (US); Shaohui Sun, Union City, CA (US)

(73) Assignee: Lyft, Inc., San Francisco, CA (US)

( * ) Notice: Subject to any disclaimer, the term of this patent is extended or adjusted under 35 U.S.C. 154(b) by 181 days.

(21) Appl. No.: 17/087,375

(22) Filed: Nov. 2, 2020

(65) Prior Publication Data

US 2021/0118185 A1 Apr. 22, 2021

Related U.S. Application Data

(63) Continuation of application No. 15/900,060, filed on Feb. 20, 2018, now Pat. No. 10,825,201.

(51) Int. Cl.

| | |
|---|---|
| *G06T 7/73* | (2017.01) |
| *G06T 7/00* | (2017.01) |
| *G06F 16/29* | (2019.01) |
| *G06V 20/56* | (2022.01) |
| *G06V 10/82* | (2022.01) |
| *G06V 10/764* | (2022.01) |
| *G06V 10/44* | (2022.01) |
| *G06N 20/00* | (2019.01) |

(52) U.S. Cl.
CPC ................ *G06T 7/73* (2017.01); *G06F 16/29* (2019.01); *G06N 20/00* (2019.01); *G06T 7/97* (2017.01); *G06V 10/454* (2022.01); *G06V 10/764* (2022.01); *G06V 10/82* (2022.01); *G06V 20/56* (2022.01); *G06T 2207/20081* (2013.01); *G06T 2207/30252* (2013.01)

(58) Field of Classification Search
CPC ............. G06T 7/97; G06T 2207/20081; G06T 2207/30252; G06T 2207/20084; G06T 7/73; G06F 16/29; G06N 20/00; G06N 3/0445; G06N 3/0454; G06N 3/08; G06V 10/82; G06V 20/56; G06V 10/454; G06V 10/764; G06K 9/627
See application file for complete search history.

(56) References Cited

U.S. PATENT DOCUMENTS

| | | | |
|---|---|---|---|
| 2015/0269481 A1* | 9/2015 | Annapureddy | G06N 3/0481 706/21 |
| 2018/0005407 A1* | 1/2018 | Browning | G01C 21/28 |
| 2018/0086264 A1* | 3/2018 | Pedersen | H04R 1/406 |
| 2019/0064392 A1* | 2/2019 | Feng | H02J 3/381 |

* cited by examiner

*Primary Examiner* — Amandeep Saini
(74) *Attorney, Agent, or Firm* — Baker Botts L.L.P.

(57) ABSTRACT

In one embodiment, a method includes receiving an image associated with an object in an environment, the image being captured by sensors associated with a vehicle, generating a feature representation of the image, determining a potential ground control point associated with the object based on the feature representation of the image, determining a predetermined location reading based on the potential ground control point, calculating a differential relative to the predetermined location reading based on the potential ground control point, and determining a location of the vehicle based on the differential and the predetermined location reading based on the potential ground control point.

20 Claims, 13 Drawing Sheets

DEEP DIRECT LOCALIZATION FROM GROUND IMAGERY AND LOCATION READINGS

PRIORITY

This application is a continuation under 35 U.S.C. § 120 of U.S. patent application Ser. No. 15/900,060, filed 20 Feb. 2018, now issued as U.S. patent Ser. No. 10/825,201, which is incorporated herein by reference.

BACKGROUND

To provide satisfactory experience to users, transportation management systems and/or autonomous driving systems may need to determine a variety of information about a vehicle and the geographic area where the vehicle is operating. For example, the transportation management system relies on accurate estimated time of arrival (ETA), optimal routing, accurate navigation and effective autonomous vehicle controls. The accuracy of each of the aforementioned tasks may each depend on the accuracy of geographic localization estimates of a vehicle. For example, transportation management systems may constantly update ETA of a vehicle to a destination location based on the estimated location of a vehicle. The systems may receive the estimated location information and then calculate the ETA to a destination based on traffic, routing, and/or other relevant information that may affect the time to arrive of the vehicle from the estimated location to the destination location. As a result, inaccurate location information may lead to inaccurate ETAs, which in turn may frustrate users or lead to inaccurate down-stream operations and/or applications that are based on location information and/or ETA information (e.g., optimal routing, matching providers to a request, pickup/dropoff location determination, etc.).

Geographic localization is typically estimated using coordinates from GPS receivers coupled with a digital map (e.g., a two-dimensional or three-dimensional street map) that provides street-level context for the coordinates. For example, phone-grade GPS is one type of GPS receiver that is commonly integrated within smartphones or other types of mobile devices to provide location-based services, such as navigation. However, raw GPS signals from GPS receivers may be noisy and erroneous because GPS receivers are easily affected by external factors such as atmospheric uncertainty, building blockage, multi-path bounced signals, satellite biases, etc. Using raw GPS signals, therefore, may lead to inaccurate geographic localization. Although geographic localization may be more accurately determined using expensive high-end GPS equipment, the high-cost and large physical size of such high-end GPS equipment may be impractical, especially in cases where the GPS receiver is embedded within a user's mobile device.

DESCRIPTION OF EXAMPLE EMBODIMENTS

Figure 1:
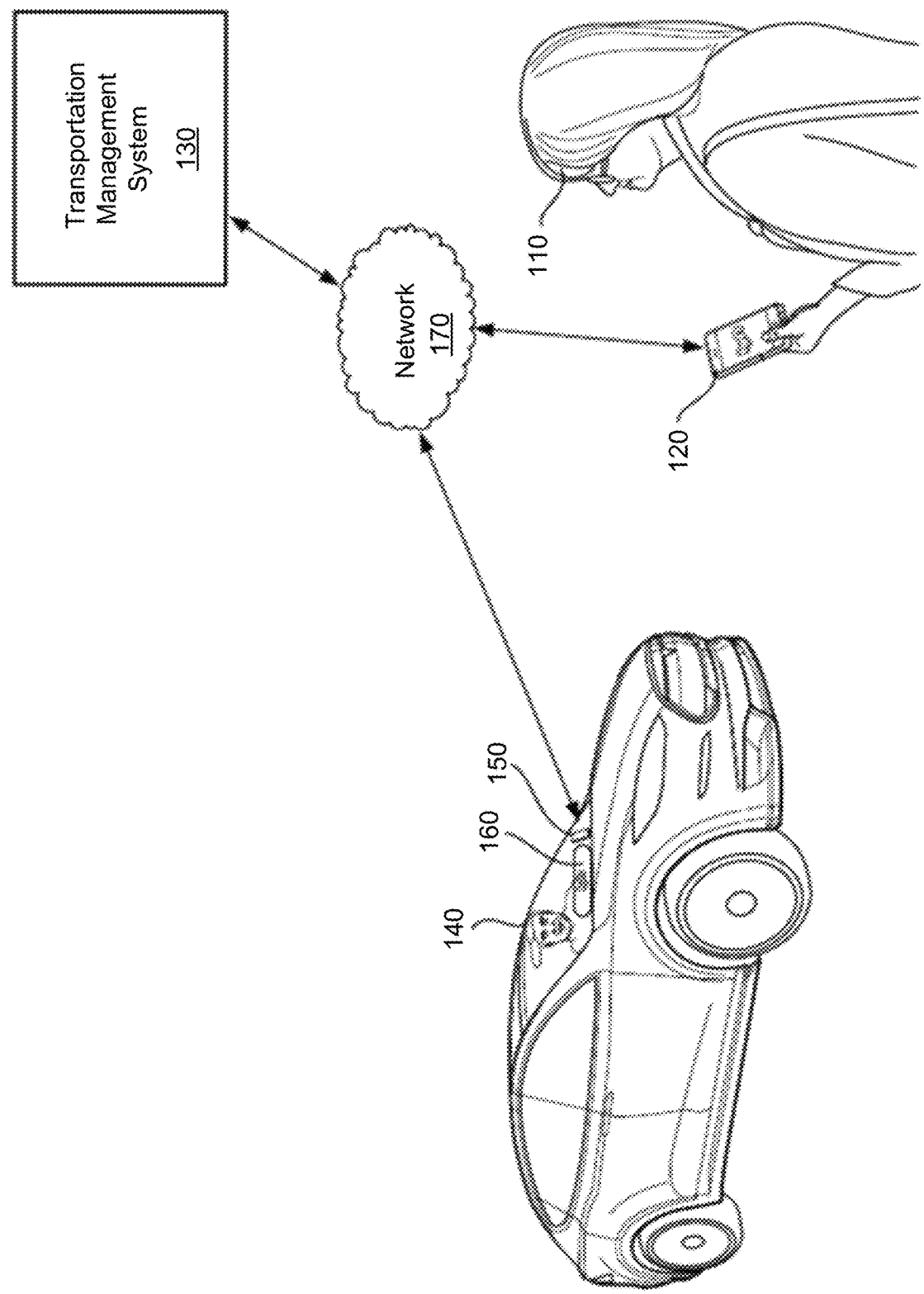
FIG. 1 illustrates an example of a transportation management system for matching ride requestors with ride providers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Transportation management systems and/or autonomous driving systems may be based on a plurality of functional components including determining accurate estimated time of arrival (ETA), determining optimal routing, performing accurate navigation and conducting effective autonomous vehicle controls. The plurality of functional components may commonly depend on accurate geographic localization, particularly at lane-level precision. To be specific, lane-level precision refers to a granularity of positioning precision that is sufficient for discerning the particular road lane in which the positioning device is located (e.g., geographic localization with lane-level precision allows a system to determine whether a vehicle is in the correct lane of a roadway). Additionally, as fast response and low cost are both desirable for transportation management systems and/or autonomous driving systems, lane-level geographic localization may need to be achieved in an efficient way, both timewise and computation-wise.

In some embodiments, geographic localization may be achieved by using GPS receivers. However, raw GPS signals may be noisy and erroneous for localization, which may lead to failure of lane-level geographic localization. For example, a reported location of a GPS receiver associated with the mobile device may report that the vehicle is located in a building that is 10, 15, 20 or more yards away from the actual location of the vehicle at the time the reading was made. While these location readings can be improved by filtering errant locations, averaging positions over time, and/or performing other signal processing techniques, the accuracy of such GPS signals are rarely accurate within lane-level granularity in practice. Geographic localization may be alternatively achieved by using expensive high-end GPS equipment. However, low cost is important for transportation management systems and/or autonomous driving systems so that special high-end equipment is not necessary to provide transportation through the systems and users can receive low-cost rides as a result. Furthermore, the high cost of high-end GPS equipment may be a prohibitively high barrier-to-entry for non-professional or casual transportation providers who wish to service transportation requestors using their existing vehicles and positioning equipments (e.g., smartphones). In addition to cost, high-end GPS receivers are typically much larger than phone-grade GPS receivers, which makes them unsuitable for being embedded within mobile devices (e.g., smartphones and tablets) or other systems with stringent size limitations. Therefore, using expensive high-end GPS equipment for lane-level geographic localization may be an impractical option.

Particular embodiments described herein relate to a localization system that may improve the accuracy of geographic localization, even at the lane-level, with low cost and low computational load. In particular embodiments, the localization system may comprise an image localization model that is trained using a geo-spatial deep convolutional neural network. Deep convolutional neural network is a particular architecture of deep learning. This architecture exploits multiple layers of nonlinear information processing for feature extraction of images and image analysis. In particular embodiments, the localization system may implement the deep convolutional neural network in a geo-spatial scenario for training the image localization model, which is particularly effective for localizing vehicles based on ground images.

In particular embodiments, the geo-spatial deep convolutional neural network may iteratively learn how to extract relevant features from ground images that are discriminative for determining geographic locations. The extracted features of the ground images may have a particular relationship with the locations associated with the ground images. However, the relationship may be not readily apparent to humans due to its complexity. In particular embodiments, the geo-spatial deep convolutional neural network may learn such a relationship between the extracted features of ground images and the corresponding geographic locations. In particular embodiments, the localization system may achieve lane-level accuracy using ground images collected by image capture equipment, such as in-vehicle dash cameras or phone cameras mounted behind the windshields of vehicles along with raw location data associated with the images. Such image data may be used to train the image localization model for lane-level geographic localization.

In particular embodiments, the localization system may determine a geographic location for a vehicle directly from ground images and raw GPS coordinates without the use of 3D or HD maps. Using 3D or HD maps for localization requires constructing and/or updating maps of geographic environment and constantly comparing a vehicle's surroundings with the maps to determine the location of the vehicle. In particular, constructing reliable 3D or HD maps requires a considerable number of sensors to collect a large amount of sensory data for the same geographic environment, aggregating the data, and using complicated algorithms to generate 3D or HD maps, which is costly and sometimes not readily available. In contrast, the localization system disclosed herein does not need to compare sensory data collected from a vehicle with a 3D/HD map to determine its location. Rather, the localization system uses the geo-spatial deep convolutional neural network to extract features directly from its input, namely ground images, and learns a relationship directly between the extracted features and another input, namely associated raw location readings. In one embodiment, the localization system may only take a location reading (e.g., raw GPS coordinate) and a ground image associated with the location reading as input and determine a lane-level geographic location as output. In the process of determining the lane-level geographic location, the localization system does not require reconstructing a 3D or HD map prior to the determining and comparing the ground image with a 3D or HD map. Because the localization system determines the geographic location without comparison to a 3D model and through the use of a deep neural network configuration, the localization process may be characterized as deep direct localization. In particular embodiments, the localization system may improve a variety of tasks associated with transportation management systems and/or autonomous driving systems based on the improved lane-level geographic localization.

As an example and not by way of limitation, the localization system may use a plurality of ground images collected within a particular area to train a machine-learning model offline. A vehicle may be moving within this area and a dash camera may be taking pictures periodically and uploading them to a data server of the localization system. When the vehicle requests a routing service in real time, the localization system may process a current image collected by this vehicle using the trained machine-learning model to determine the location of the vehicle. In some embodiments, the location may be accurate enough to determine which specific lane the vehicle is located in within the roadway and/or the location of the vehicle within a short distance (e.g., 3-6 feet) of the true location of the vehicle. The localization system may use the accurate lane-level geographic location to determine accurate lane-level routing and/or ETA for the vehicle to the destination. For example, a vehicle may be approaching exit 17 of highway 1-95 (e.g., 10 feet away) but the vehicle is at the leftmost lane. Without lane-level localization, the ETA to a destination may be calculated based on the assumption that the vehicle will get off 1-95 from exit 17. However, as the vehicle is at the leftmost lane and is only 10 feet away from exit 17, it is very unlikely for it to be able to take exit 17. Therefore, the ETA calculated based on the assumption that the vehicle will get off 1-95 from exit 17 may be inaccurate. By accurately determining that the vehicle is at the leftmost lane, the localization system may calculate a more accurate ETA based on the assumption that the vehicle will get off 1-95 from the next exit, i.e., exit 18.

Embodiments described herein have several advantages. One advantage is providing better accuracy of lane-level geographic localization than the approaches based on raw GPS signals. This advantage may be attributed to the usage of ground images since they may carry discriminating information that is useful for lane-level geographic localization. Another advantage is lower cost, since the system utilizes data that is readily obtainable by existing equipment (e.g., phone-grade GPS and image data) and no special equipment is required (e.g., high-end GPS equipment, specialized cameras, etc.).

Another advantage is that the present embodiments do not require the use of 3D or HD maps to perform lane-level geographic localization. Although in certain embodiments, localization may be determined using 3D or HD maps with detailed, precise street-level measurements, doing so may not be practical due to the high cost of obtaining such maps. For example, in embodiments where 3D/HD maps are used to train machine-learning models, the cost of obtaining 3D/HD maps may limit the quantity and/or quality of training samples, which in turn may negatively affect the training. Even if such a model is trained, its utility is limited since users of the model, such as individual transportation providers, may not have the costly equipment needed for generating 3D/HD inference data. In contrast, the particular embodiments described below have no requirement for 3D reconstruction from 2D images using HD mapping to pre-generate 3D maps prior to localizing vehicles. It is very costly, sometimes even impossible, to generate 3D maps from 2D images. Hence, the advantage of no requirement for 3D maps enables the system to be much more scalable.

Another advantage may be fast determination of a location of a vehicle, which in turn may enable down-stream applications, such as ETA estimation, routing, navigation, etc., to be quickly and accurately determined. This advantage may be attributed to the offline training of a machine-learning model and the real-time calculation of the vehicle location using the pre-trained machine-learning model. Additionally, the lack of a need for a 3D model also improves the speed and limits the processing requirements necessary of present embodiments.

FIG. 1 illustrates an example of a transportation management system 130 for matching ride requestors 110 and ride providers 140, in accordance with particular embodiments described herein. The transportation management system 130 may be configured to communicate with both the requestor computing device 120 and the provider computing device 150. The provider computing device 150 may be configured to communicate with a transportation management vehicle device 160 that is configured to easily and efficiently provide information to a provider 140 and/or a requestor 110, obtain internal sensor data pertaining to the passenger compartment of the vehicle, and/or adjust configurations of the vehicle.

In particular embodiments, the requestor 110 may use a transportation application running on a requestor computing device 120 to request a ride from a specified pick-up location to a specified drop-off location. The request may be sent over a communication network 170 to the transportation management system 130. The ride request may include request information, which may include, for example, an identifier associated with the requestor and/or the requestor computing device, user information associated with the requestor, a location of the requestor computing device at the time of the request, a requested time for the ride (e.g., at a scheduled future time or an instant/current time), and/or any other relevant information for matching the ride request with ride providers as described herein. The ride request may also include transport information, such as, e.g., a pick-up location, a drop-off location, a "best fit/predictive" location (e.g., a particular location in the origination/destination region suitable for pick-up/drop-off at a given time), preferred pick-up/drop-off location type (e.g., a curb segment), or any other suitable information for indicating the requestor's transportation preferences and/or objectives. In particular embodiments, the ride request may further include any other preferences or needs of the requestor, including, for example, navigation preferences (e.g., highways vs. local streets; particular routes; stop overs), music or entertainment preferences (e.g., link to a music playlist or station hosted by a 3rd-party music provider, news station, etc.), personalized pattern/color to display on a transportation management vehicle device to help the ride provider and requestor identify each other, particular vehicle features or restrictions (e.g., pet friendly, child seat, wheelchair accessible, maximum/minimum passenger or cargo compartment, etc.).

In particular embodiments, the transportation management system 130 may, in response to a ride request, identify available providers that are registered with the transportation management system 130 through an application on their mobile computing device 150 or through an associated transportation management vehicle device 160. For example, the transportation management system 130 may locate candidate ride providers 140 who are available (e.g., based on a status indicator provided through each ride provider's 140 computing device 150) and in the general vicinity of the requested pick-up location (e.g., based on GPS data provided by the provider computing device 150 and the requestor computing device 120). The transportation management system 130 may send a notification relating to the requested ride to the computing devices 150 of the candidate ride providers 140. The notification may include information pertaining to the request, including, e.g., the pick-up and drop-off locations, recommended route, estimated time of travel, fees for the ride, the requestor's profile information (e.g., name, profile picture, ratings, etc.), particular ride requests (e.g., car seat availability), and any other pertinent information that would allow the ride provider 140 to make an informed decision as to whether to accept or reject the ride request. Upon seeing the notification, the provider 140 may accept or reject the ride request through the provider communication device 150. Additionally and/or alternatively, in particular embodiments, the provider 140 may be predictively and/or automatically matched with a ride request such that the provider 140 is not required to explicitly accept the request. For instance, the provider 140 may enter a mode where the provider 140 agrees to accept all requests that are sent to the provider 140 without the ability to decline and/or review requests before accepting.

In particular embodiments, the provider computing device 150 may notify the transportation management system 130 that the provider 140 received the notification and further inform the system 130 of whether the provider 140 accepted or rejected the request. The information sent to the system 130 may include, for example, an acceptance indicator (e.g., a flag), current location of the ride provider 140, route information for transporting other passengers in the vehicle in a ride-sharing scenario (e.g., the ride provider 140 may have agreed to transport different, unrelated ride questors), schedule information regarding the ride provider's 140 future availability, diagnostics associated with the car (e.g., gas level, battery level, engine status, etc.), features, amenities, and/or limitations of the vehicle, and/or any other suitable information. In particular embodiments, the transportation management system 130 may make a further determination of the suitability of the match and select the best match for the ride requestor 110. In particular embodiments, the transportation management system 130 may provide the ride requestor 110 information pertaining to the ride providers 140 who accepted the request and allow the ride requestor 110 to select the desired provider 140. Once a match has been finalized, the provider 140 and the requestor 110 may receive information associated with the other party and relevant transport information, such as requestor 110 and provider 140 information (e.g., name, representative symbol or graphic, social-media profile, etc.), requested pick-up and drop-off locations, suggested route, current location tracking information, ratings, past ride history and reviews, and/or any other relevant information for facilitating the match and/or service being provided. In this manner, the transportation management system 130 may dynamically match ride requestors 110 and providers 140 that are distributed throughout a geographic area.

In particular embodiments, the transportation management system 130 may provide information to the ride requestor device 120 and the provider device 150 (and/or transportation management vehicle device 160) to facilitate the parties finding each other. For example, the system 130 may monitor the GPS locations of the requestor computing device 120 and provider computing device 150 and make the GPS location of one device available to the other device. For example, as the provider computing device 150 gets closer to the request location, the transportation management system may monitor the location of the provider computing device 150 and send the location of the requestor computing device 120 to the provider computing device 150 (and vice versa). As such, the provider computing device 150 may display the current location of the requestor computing device 120 to allow the provider 140 find and pick-up the requestor 110. In particular embodiments, the provider computing device 150 may determine a proximity vector between the present location of the provider computing device 150 and the location of the requestor computing device 120. Based on this information, the provider computing device 150 may provide navigating instructions to the provider 140 so that he/she may find the exact location of the requestor 110.

To further guide the provider 140 as he/she is driving, the transportation management system 130 and/or the provider computing device may determine and provide a proximity indicator (e.g., a color, pattern, image, animation, and/or pattern of colors) to be presented on a display visible to the provider 140. The display may be on the provider computing device 150, the transportation management vehicle device 160, and/or a display integrated with the vehicle. Proximity indicators may also include additional or other types of multimedia elements such as sounds, audio/visual presentations, haptic feedback (e.g., vibrations, etc.), holograms, augmented reality presentations, etc. For example, a haptic-feedback proximity indicator may cause devices within the vehicle (e.g., the computing device 150, the transportation management vehicle device 160, and/or components of the vehicle, such as the steering wheel) to vibrate. The vibration (or any other type of proximity indicator) may become stronger or weaker depending on the distance to the requestor computing device 120. The provider computing device 150 may present the proximity indicator so that the provider 140 may quickly and easily navigate to the location of the requestor 110. In particular embodiments, the provider computing device 150 may pass the proximity indicator to a transportation management vehicle device 160 that is configured to present the corresponding color, pattern, pattern of colors, animation, and/or image on a large display that can easily, intuitively, and safely be followed by the provider (e.g., driver) to the location of the requestor (e.g., rider) 110. The indicator provided by the transportation management vehicle device 160 may also be visible to the ride requestor 110 through the vehicle's windshield. In particular embodiments, the ride requestor 110, knowing or having been informed of the proximity indicator's characteristics (e.g., a particular color, greeting, animation, etc.), may look for such proximity indicator in nearby vehicles to find the ride provider 140. Similarly, the indicator may also be displayed on the requestor's computing device 120, and the requestor 110 may hold the device 120 so that nearby drivers could see the displayed proximity indicator for purposes of helping the parties locate each other.

In particular embodiments, an interaction indicator associated with the requestor 110 of a matched ride may be displayed based on the proximity between the requestor computing device 120 and the provider computing device 150. For example, when the parties are within a distance threshold of each other, an interaction indicator including a name, a graphic, and/or a greeting generated based on the requestor's information and/or provider's information may be presented on the provider computing device 150 and/or the transportation management vehicle device 160. Similar to the techniques described herein related to the proximity indicator, the interaction indicator may be displayed to provide a welcoming interaction to the requestor 110 upon the requestor 110 approaching and/or entering a vehicle of the provider 140. Similar to the proximity indicator, the interaction indicator may be displayed on any number of different displays within the provider vehicle and/or through the transportation management vehicle device 160. Additionally, the same techniques described herein regarding the provider computing device 150 may be implemented by the requestor computing device 120 to display an interaction indicator and/or proximity indicator on the requestor computing device 120 or an associated display.

In particular embodiments, the transportation management system 130 may significantly rely on location information of the provider computing device 150 for a plurality of tasks, as previously described. To be more specific, the transportation management system 130 may use location information to dynamically match ride requestors 110 and providers 140 that are distributed throughout a geographic area. The transportation management system 130 may use location information to locate candidate ride providers 140 who are available and in the general vicinity of the requested pick-up. The transportation management system 130 may also use location information to determine routes and calculate estimated time of travel (ETT) or estimated time of arrival (ETA) to a request or destination location, distance of travel, and fees for the ride. The location information may be also important for obtaining route information for transporting other passengers in the vehicle in a ride-sharing scenario, therefore facilitating the match and/or service being provided to a ride requestor 110. For these and other reasons, it may be desirable to develop effective mechanisms to obtain accurate location information in the transportation management system 130.

Figure 2:
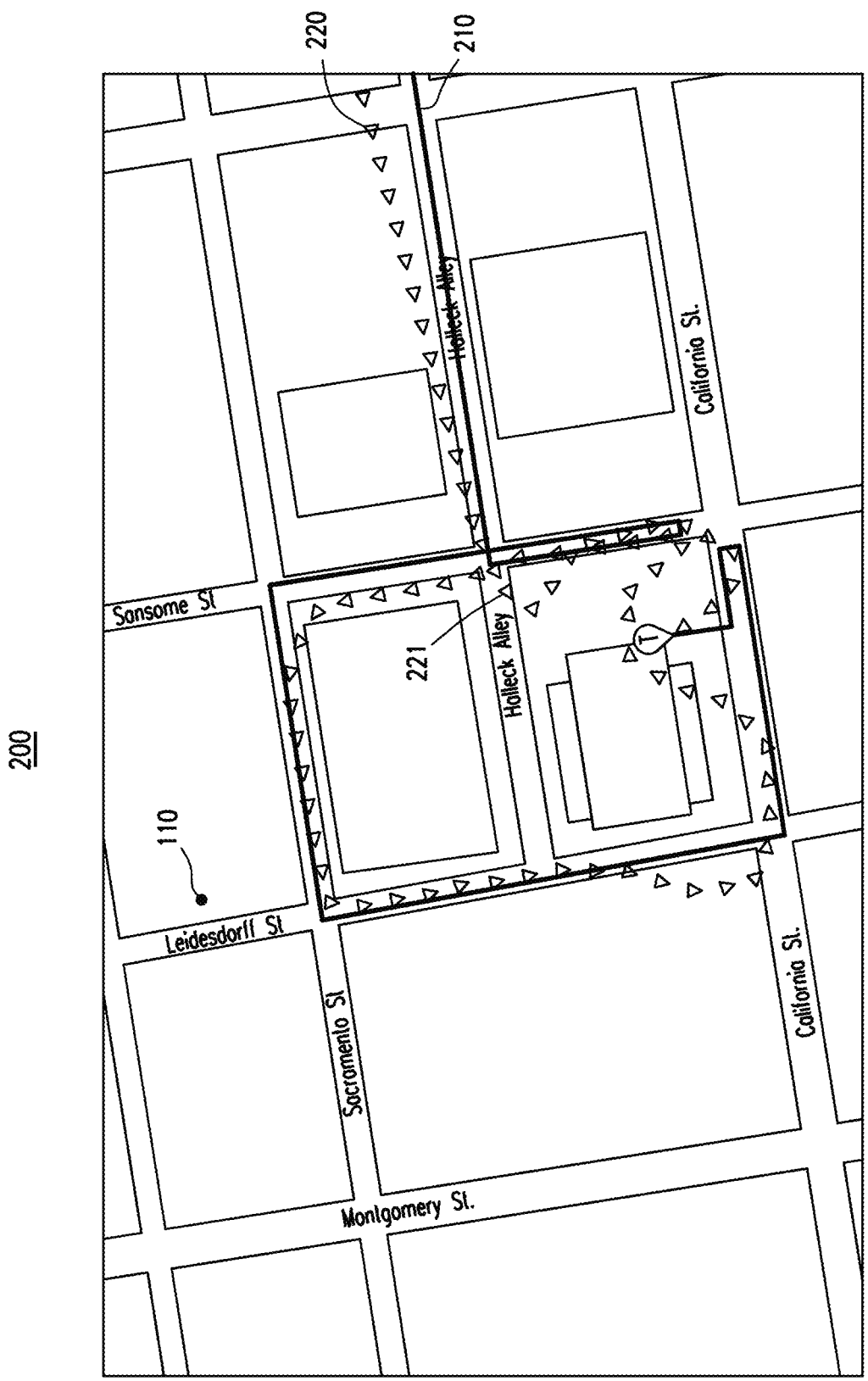
FIG. 2 illustrates an example comparison between an actual ride path and an inaccurate ride path generated based on raw GPS coordinates.

FIG. 2 illustrates an example comparison between an actual ride path 210 and an inaccurate ride path 220 generated based on raw GPS coordinates. The map in FIG. 2 corresponds to a canyon area in downtown San Francisco. Actual ride path 210 indicates the actual ride path of a vehicle. GPS ride path 220 indicates the inaccurate ride path of the vehicle generated based on raw GPS coordinate readings of a device associated with the vehicle. The raw GPS coordinates are significantly erroneous as illustrated in FIG. 2. As a result, using such raw GPS coordinates for lane-level geographic localization may cause a plurality of problems. As an example and not by way of limitation, the raw GPS coordinates may lead to inaccurate ETA or navigation. For example, a system may be determining a match for a ride requestor 110 in FIG. 2. An errant raw GPS coordinate 221 in FIG. 2 may indicate that a vehicle just passed Sansome Street moving along Halleck Alley. According to the errant raw GPS coordinate 221, a system may calculate an inaccurate ETA for the vehicle to arrive at the ride requestor's 110 location. The inaccurate ETA may be compared to ETAs for other available vehicles in the area and may mistakenly be considered the shortest among other available vehicles in the area. Accordingly, the system may mistakenly match the vehicle with the ride requestor 110 based on a mistaken understanding of where the vehicle is located and how long it will take the vehicle to reach the request location. As such, a pick up of the requestor may be significantly delayed and the efficiency of the system as a whole may be compromised by inaccurate location determinations as vehicles that are not the actual best match for a request are matched throughout a region.

Further, the system may calculate a mistaken route may direct the vehicle to move along Halleck Alley and then turn right to Leidesdorff Street to reach the requestor. However, instead of being at Halleck Alley based on the errant raw GPS coordinate 221, the vehicle is actually on Sansome Street moving towards California Street. Therefore, the ETA for this vehicle to arrive at the ride requestor's 110 location may be much longer, and as such the system should not match this vehicle with the ride requestor 110 if there are other available vehicles with shorter ETAs. As another example and not by way of limitation, navigation for an autonomous driving vehicle based on such raw GPS coordinates may cause confusion and/or unsafe conditions leading to potential damage to property or injury to pedestrians.

In particular embodiments, a localization system may determine more accurate lane-level geographic locations of vehicles based on ground images collected by the vehicles and location readings associated with these ground images. As an example and not by way of limitation, location readings may comprise GPS coordinates. As another example and not by way of limitation, location readings may be derived from the utilization of speed, bearing, gyroscope rotation data etc. along with GPS coordinates. As another example and not by way of limitation, location readings may be derived from local reference maps. Local reference maps may include a variety of map types that show the boundaries and names of geographic areas in which the geographic features and their identifiers are coincident with the boundaries. Local reference maps may also include geohash in which a geographic location may be encoded into a short string of letters and digits. For example, if a ground image captures a street intersection, the geohash data may be used to refine the location reading.

Figure 3:
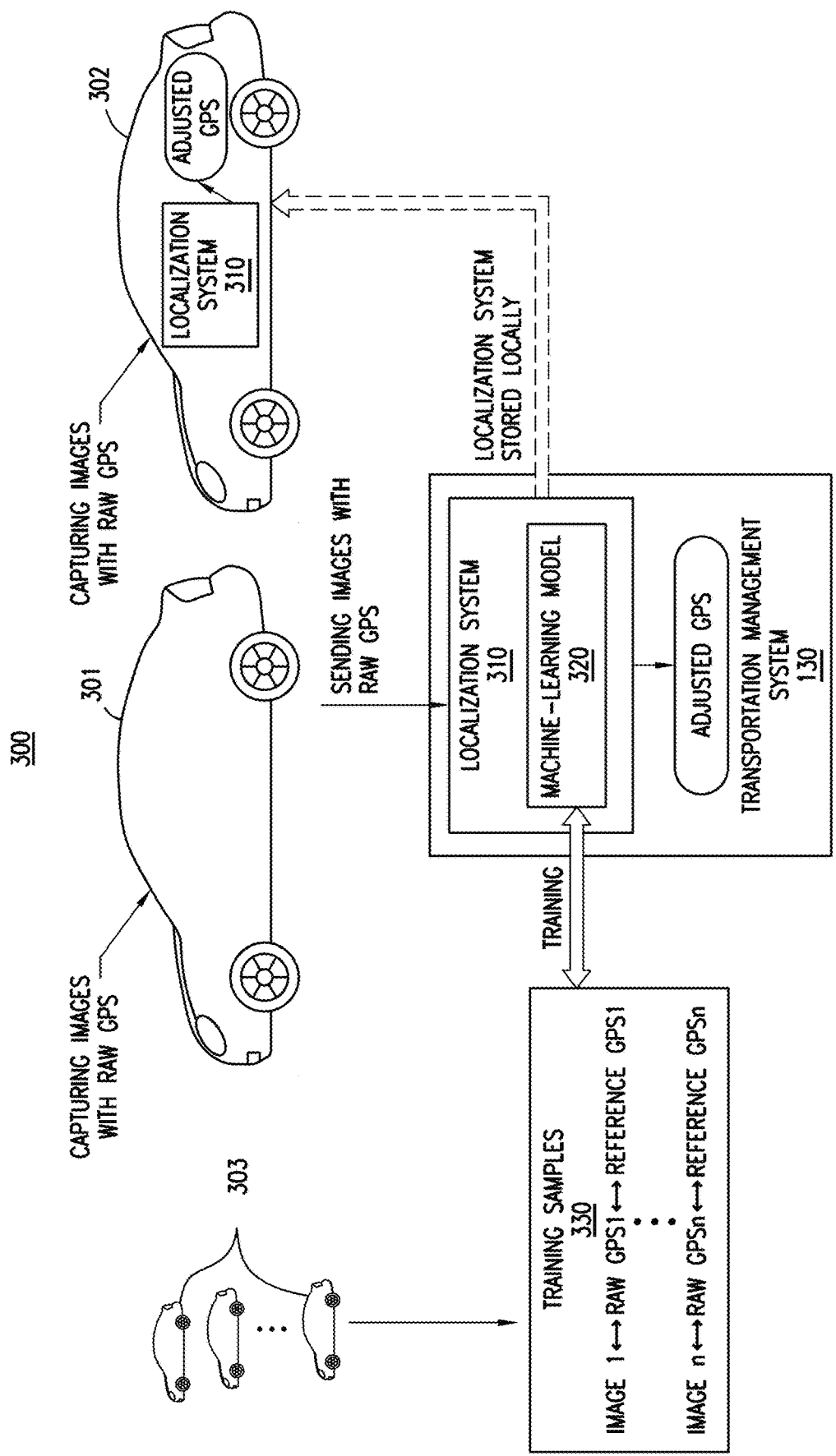
FIG. 3 illustrates an example solution for determining adjusted GPS coordinates.

FIG. 3 illustrates an example solution for determining adjusted GPS coordinates. In particular embodiments, a localization system 310 may determine an adjusted location reading of a vehicle, based on one or more images collected by the vehicle, by calculating a differential of location readings and combining the differential with a raw location reading. The adjusted location reading may be more accurate than the original raw location reading. In particular embodiments, location reading(s) may comprise GPS coordinate(s). As an example and not by way of limitation, a raw GPS coordinate obtained from a phone-grade GPS receiver with respect to a vehicle may be 38.910° N, 77.048° W. The localization system 310 may calculate a differential of 4.109° N, −5.822° W based on an image taken by the dash camera of the vehicle. The localization system 310 may further determine an adjusted GPS coordinate by combining the raw GPS coordinate with the differential, which is 43.019° N, 71.226° W. As illustrated in FIG. 3, vehicle 301 may capture one or more images with raw GPS coordinates and send them to the localization system 310. In particular embodiments, the localization system 310 may reside with the transportation management system 130. The localization system 310 may therefore process data that has been gathered and sent from remote vehicles to determine the locations of these vehicles. Continuing with the previous example, the localization system 310 may determine an adjusted GPS coordinate as the location of vehicle 301. In alternative embodiments, the localization system 310, once trained, may be stored locally on each vehicle or on a mobile device of each ride provider 140. As a result, the localization system 310 may determine the location of each vehicle locally. For example, the localization system 310 may be stored locally on vehicle 302 as illustrated in FIG. 3. Vehicle 302 may capture images with raw GPS coordinates and the localization system 310 may process these images with raw GPS locally. The localization system 310 on vehicle 302 may then determine a more accurate adjusted GPS coordinate as the location of vehicle 302. In particular embodiments, the localization system 310 may further determine a particular lane of a roadway the vehicle is in at a current time. Although this disclosure describes determining particular location readings in a particular manner, this disclosure contemplates determining any suitable location readings in any suitable manner.

In particular embodiments, a localization system 310 may calculate a differential of location readings (e.g., GPS coordinate) based on a machine-learning model 320. For example, the machine-learning model 320 may be integrated in the localization system 310 as illustrated in FIG. 3. In particular embodiments, the localization system 310 may access a plurality of training samples 330 for the training of the machine-learning model 320. The plurality of training samples may comprise: (1) a plurality of training images, (2) a plurality of raw location readings (e.g., GPS coordinates) associated with the plurality of training images, respectively, and (3) a plurality of reference location readings (e.g., GPS coordinates) associated with the plurality of raw location readings (e.g., GPS coordinates), respectively. In particular embodiments, the plurality of training images may be obtained using one or more sensors of one or more vehicles (e.g., cameras of mobile devices in the vehicles). The plurality of training images may comprise ground scenes. As an example and not by way of limitation, the one or more sensors may include dash cameras of vehicles or mobile computing device (e.g., smartphone) cameras mounted behind the windshields of the vehicles. As another example and not by way of limitation, the ground scenes captured in the training images may show the environment surrounding the vehicles, including, for example, streets, buildings, traffic signs and lights, vehicles, pedestrians, etc. For example, FIG. 3 illustrates that one or more vehicles 330 may obtain a plurality of images as part of the training samples 330. In particular embodiments, the localization system 310 may obtain a plurality of raw GPS coordinates associated with the plurality of training images, respectively. As an example and not by way of limitation, a training image taken by a phone camera in a vehicle may be easily associated with a raw GPS coordinate as the phone may have a phone-grade GPS receiver that can provide GPS readings captured at the time the image is taken. In particular embodiments, the localization system 310 may obtain a plurality of reference GPS coordinates associated with the plurality of raw GPS coordinates, respectively. In particular embodiments, the reference GPS coordinates may comprise the ground-truth GPS coordinates (i.e., highly accurate GPS coordinates). For example, the ground-truth GPS coordinate associated with a training image may indicate the precise location of where the image was taken (e.g., based on human determination and/or high-end GPS equipment). As illustrated in FIG. 3, the training samples 330 comprise a plurality of images, with each of them associated with a raw GPS coordinate and a reference GPS coordinate. The localization system 310 may access these training samples 330 for training the machine-learning model 320.

Figure 4:
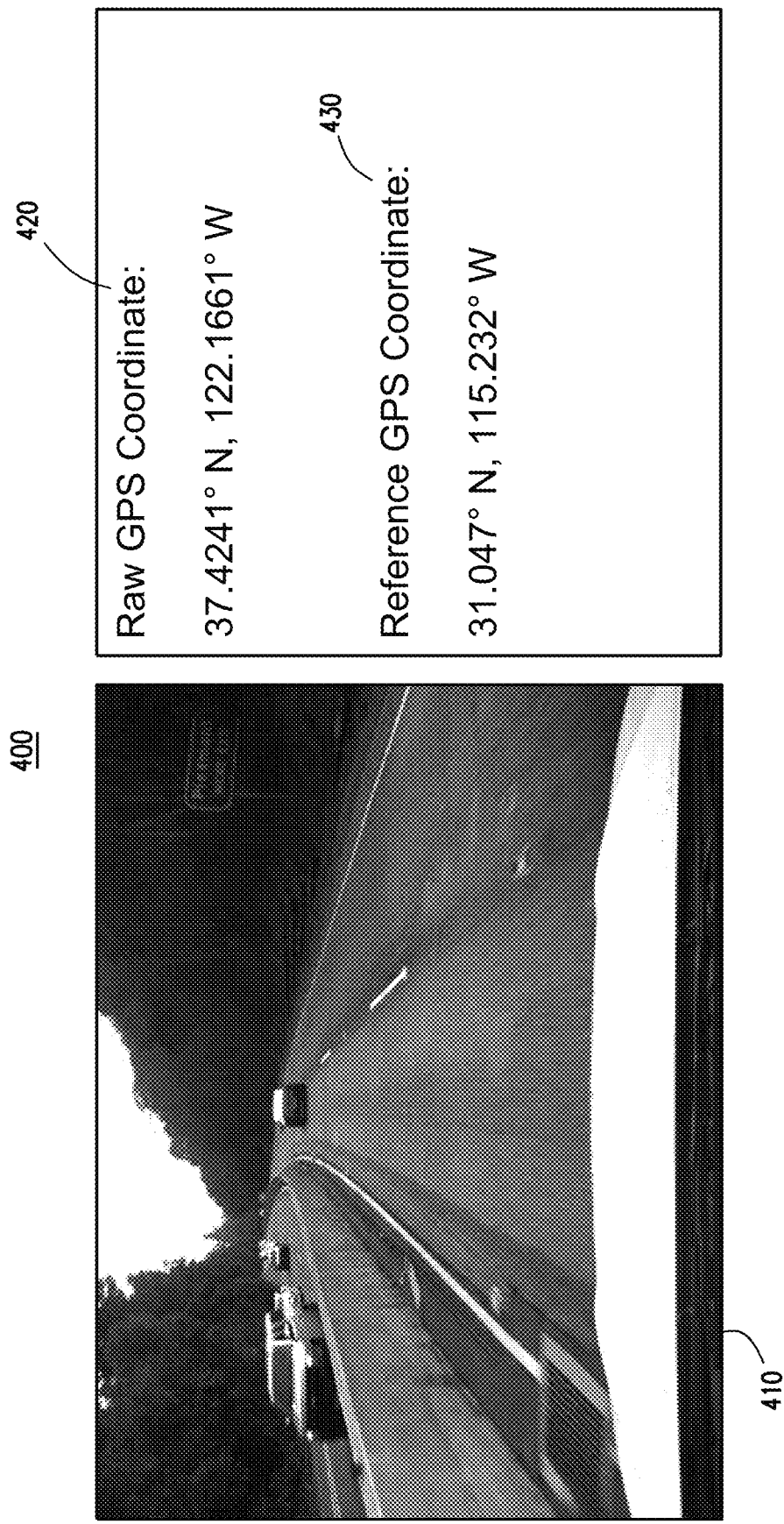
FIG. 4 illustrate an example training sample that may be used to train a machine-learning model for localization as a first type of training.

FIG. 4 illustrates an example training sample 400 that may be used to train a machine-learning model 320 for localization as a first type of training. In the first type of training, the machine-learning model 320 is trained based on: (1) extracting features from input images, and (2) learning a relationship between the extracted features and differentials between the raw location readings associated with the input images and the respective reference location readings associated with the input images. The trained machine-learning model 320 may therefore be used for localization with a querying image and associated raw location reading as input. As an example and not by way of limitation, the training sample 400 may comprise an image 410 of a view in front of a vehicle (e.g., captured using the camera of a mobile device in the vehicle), a raw GPS coordinate 420 (37.4241° N, 122.1661° W) and a reference GPS coordinate 430 (31.047° N, 115.232° W) which is a ground-truth GPS coordinate. In particular embodiments, the localization system 310 may use a plurality of training samples 400 for training the machine-learning model 320.

Figure 5:
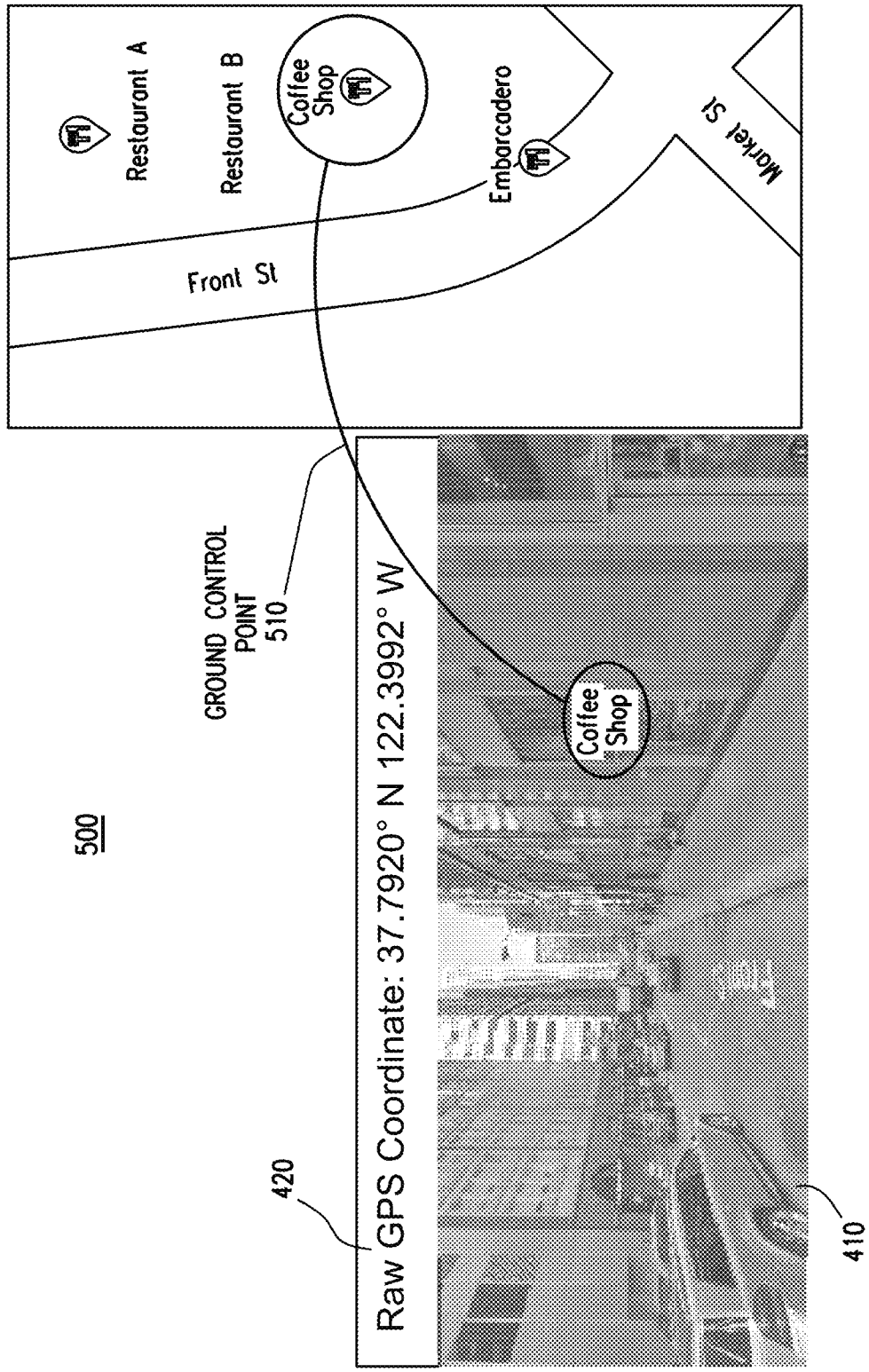
FIG. 5 illustrates another example training sample that may be used to train a machine-learning model for localization as a second type of training.

FIG. 5 illustrates another example training sample 500 that may be used to train a machine-learning model 320 for localization as a second type of training. In the second type of training, the machine-learning model 320 is trained based on: (1) extracting features from input images, and (2) learning a relationship between the extracted features and differentials between the raw location readings associated with the input images and the surrounding location readings. The trained machine-learning model 320 may therefore be used for localization with only a querying image as input. As an example and not by way of limitation, the training sample 500 in FIG. 5 may comprise an image 410 of a view in front of a vehicle, a raw GPS coordinate 420 and a ground control point 510. In particular embodiments, a reference GPS coordinate 430 may be determined based on the ground control point 510. The ground control point 510 may comprise a location within a pre-defined distance from the corresponding raw GPS coordinate 420. As an example and not by way of limitation, the pre-defined distance may be 0.1 meters, 1 meters, 5 meters, or any suitable length. As exemplified in FIG. 5, the ground control point 510 may be a Coffee Shop and the ground-truth GPS coordinate of the Coffee Shop may be known. In particular embodiments, the localization system 310 may use a plurality of training samples 500 for training the machine-learning model 320. Although this disclosure describes obtaining particular training samples for localization in a particular manner, this disclosure contemplates obtaining any suitable training samples for localization in any suitable manner.

In particular embodiments, the localization system 310 may be based on a machine-learning model 320. In particular embodiments, the architecture of the machine-learning model 320 may comprise a convolutional neural network (CNN) and one or more long short-term memory units (LSTM). A convolutional neural network (CNN) may comprise a class of deep, feed-forward artificial neural networks that may be effective for analyzing images. A convolutional neural network (CNN) may use a variation of multi-layer perceptrons designed to require minimal pre-processing. The multi-layer perceptrons may be also known as shift invariant or space invariant artificial neural networks because of their shared-weights architecture and translation invariance characteristics. In particular embodiments, the convolutional neural network may comprise a plurality of sequential layers. A long short-term memory (LSTM) unit may comprise a recurrent neural network which may be used as a building component or block (of hidden layers) for an eventually bigger recurrent neural network. The LSTM unit is itself a recurrent network because it contains recurrent connections similar to connections in a conventional recurrent neural network. In particular embodiments, the convolutional neural network and the one or more long short-term memory units may be integrated. The integration may be achieved by inserting the one or more long short-term memory units after the last of the plurality of sequential layers of the convolutional neural network. In particular embodiments, the one or more long short-term memory units may comprise two long short-term memory units. In particular embodiments, the two long short-term memory units may correspond to a latitude and a longitude of a GPS coordinate, respectively.

Figure 6:
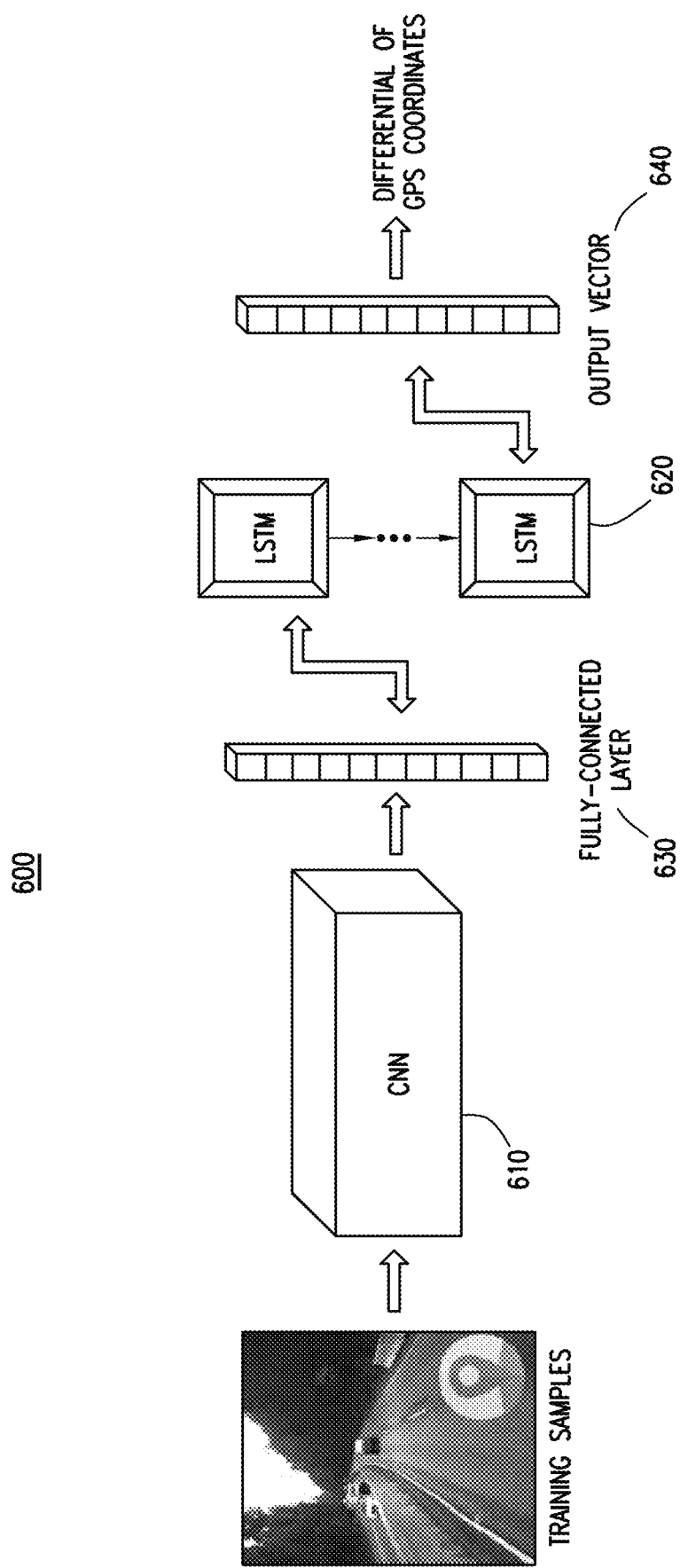
FIG. 6 illustrates an example architecture of a machine-learning model for calculating differential of GPS coordinates.

FIG. 6 illustrates an example architecture 600 of a machine-learning model 320 for calculating differential of GPS coordinates. As an example and not by way of limitation, the architecture in FIG. 6 may comprise one CNN 610 and any number (e.g., two) of LSTM 620. The LSTM 620 may be inserted after the last sequential layer of CNN 610, which is a fully connected layer 630. The output of the LSTM 620 may be an Output Vector 640. Based on the Output Vector 640, the localization system 310 may calculate differential of GPS coordinates. Although this disclosure describes a particular architecture for training a particular machine-learning model in a particular manner, this disclosure contemplates any suitable architecture for training any suitable machine-learning model in any suitable manner.

In particular embodiments, the localization system 310 may generate feature representations of the plurality of training images 410 by processing the plurality of training images 410 using the convolutional neural network 610. In particular embodiments, the convolutional neural network 610 may be based on a pre-trained classification network. As an example and not by way of limitation, the pre-trained classification network may comprise a Residual Network. In particular embodiments, the localization system 310 may implement the convolutional neural network 610 by modifying the last fully connected layer 630 of the pre-trained classification network. In particular embodiments, the localization system 310 may use the output of the convolutional neural network 610 as the generated feature representations of the plurality of training images 410. The feature representations may be, for example, a vector of numeric values. The localization system 310 may also use the output of the convolutional neural network 610 as the input of the one or more LSTM 620. Although this disclosure describes generating particular feature representations using particular convolutional neural network in a particular manner, this disclosure contemplates generating any suitable feature representations using any suitable convolutional neural network in any suitable manner.

In particular embodiments, the localization system 310 may learn a relationship between the feature representations of the plurality of training images 410 and differentials between the plurality of raw GPS coordinates 420 and their respective reference GPS coordinates 430. The learning of the relationship may be based on the generated feature representations, the plurality of raw GPS coordinates 420, and the plurality of reference GPS coordinates 430. The learning of the relationship may be also based on the machine-learning architecture 600 and a particular loss function. In particular embodiments, the relationship may comprise a mapping function. The input of the mapping function may comprise the feature representation of a training image 410, a difference of coordinate between the raw GPS coordinate 420 of the training image 410 and the corresponding reference GPS coordinate 430. The output of the mapping function may comprise a differential of a predicted hypothesis GPS coordinate and the reference GPS coordinate 430. The differential may comprise a value corresponding to the latitude and a value corresponding to the longitude. In particular embodiments, the mapping function may be further based on a particular loss function. As an example and not by way of limitation, the loss function may be a smooth L1 loss function. For any variable x, the smooth L1 loss function may be defined as:

$$\text{smooth}_{L1}(x) = \begin{cases} 0.5x^2, & \text{if } |x| < 1 \\ |x| - 0.5, & \text{if } |x| \geq 1 \end{cases}.$$

Although this disclosure describes learning particular relationship functions in a particular manner, this disclosure contemplates learning any suitable relationship functions in any suitable manner.

Figure 7:
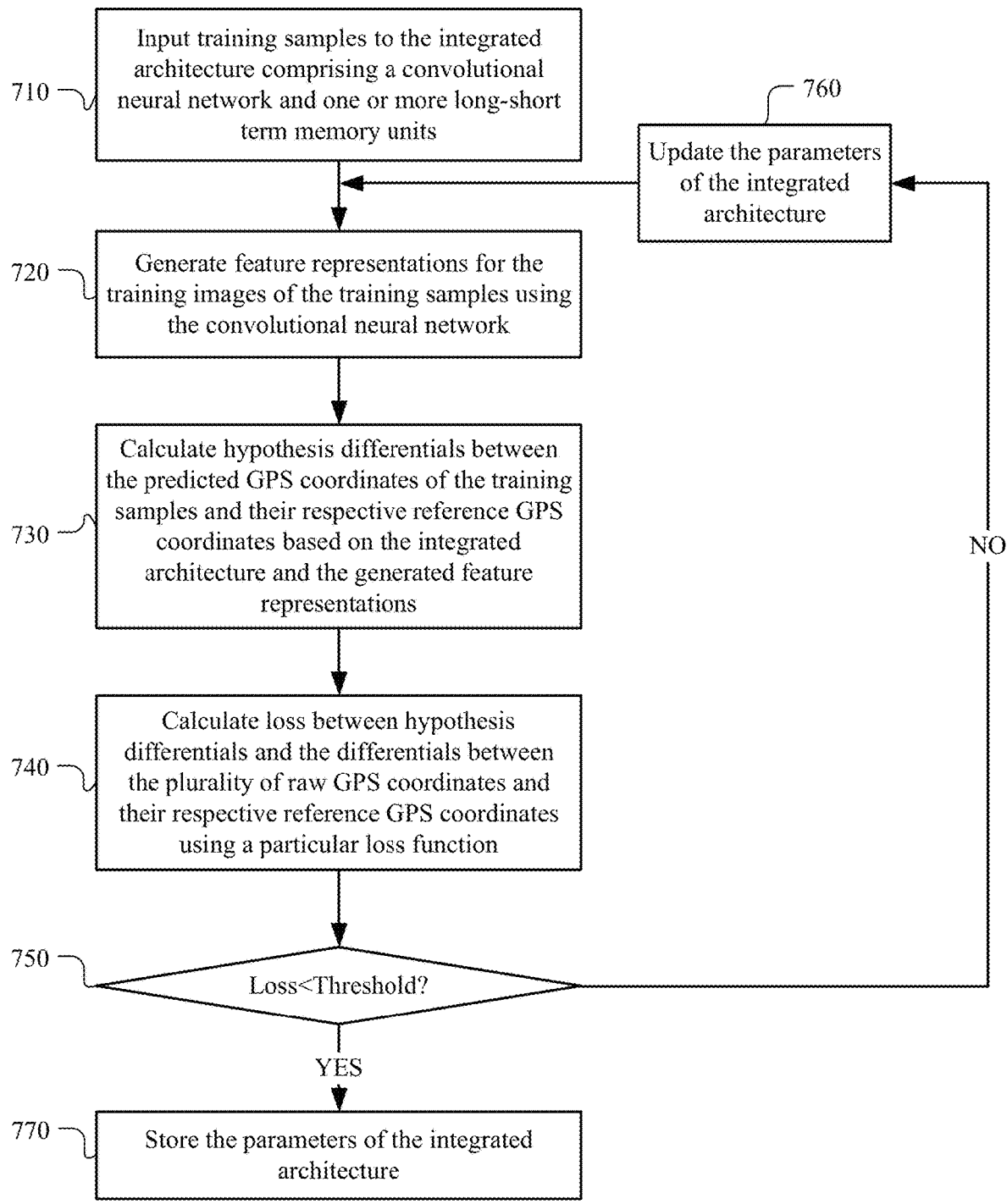
FIG. 7 illustrates an example flow diagram for training a machine-learning model using ground-truth GPS locations, according to particular embodiments.

FIG. 7 illustrates an example flow diagram 700 for training a machine-learning model 320 using ground-truth GPS locations, according to particular embodiments. In particular embodiments, the training may start at step 710. At step 710, the localization system 310 may input a plurality of training samples 400 to the integrated architecture 600. The integrated architecture 600 may comprise a CNN 610 and one or more LSTM 620. At step 720, the localization system 310 may use the CNN 610 to process the plurality of training images 410 of the plurality of training samples 400 and generate a plurality of feature representations for the plurality of training images 410, respectively. At step 730, the localization system 310 may use the integrated architecture 600 to calculate a plurality of hypothesis differentials between the plurality of predicted GPS coordinates of the plurality training images 410 and their respective reference GPS coordinates 430 based on the integrated architecture 600 and the generated feature representations of the plurality of training images 410. At step 740, the localization system 310 may calculate loss between the plurality of hypothesis differentials and the differentials between the raw GPS coordinates 420 and their respective reference GPS coordinates 430 using a particular loss function. As an example and not by way of limitation, the loss function may comprise a smooth L1 loss function. At step 750, the localization system 310 may evaluate if the overall loss is smaller than a pre-defined threshold value. If the overall loss is not smaller than the pre-defined threshold value, the localization system 310 may proceed to step 760. At step 760, the localization system 310 may update the parameters of the integrated architecture 600, which may result in an updated integrated architecture 600 accordingly. Then the localization system 310 may repeat step 720 through step 750. If the overall loss is smaller than the pre-defined threshold value, the localization system 310 may proceed to step 770. At step 770, the localization system 310 may store the parameters of the integrated architecture 600 and end the training. Although this disclosure describes a particular flow diagram for learning a particular machine-learning model in a particular manner, this disclosure contemplates any suitable flow diagram for learning any suitable machine-learning model in any suitable manner.

In particular embodiments, the localization system 310 may be trained on a system associated with the transportation management system 130. In particular embodiment, the localization system 310, once trained, may operate on a server and be used to provide cloud-based localization services. In alternative embodiments, the localization system 310, once trained, may be distributed to mobile devices of ride providers 140 or vehicles. As a result, the localization system 310 may run locally on these mobile devices or vehicles. In particular embodiments, the trained localization system 310 may receive a querying GPS coordinate and an associated querying image of a ground scene. The querying GPS coordinate and the querying image may be obtained by sensors of a vehicle. As an example and not by way of limitation, the sensors may comprise dash cameras of the vehicle or phone cameras mounted behind the windshield of the vehicle. The localization system 310 may further calculate an adjusted coordinate for the vehicle by processing the querying GPS coordinate and the querying image using the trained machine-learning model 320 in the following way. The localization system 310 may first generate a feature representation for the querying image by processing the querying image using the trained machine-learning model 320 (e.g., using the CNN 610 portion, as described above). The localization system 310 may then process the generated feature representation and the querying GPS coordinate using the trained machine-learning model 320 (e.g., using the LSTM 620 portion, as described above). The localization system 310 may then output a set of two differential values that correspond to latitude and longitude, respectively. The localization system 310 may further calculate the adjusted coordinate based on the querying GPS coordinate and the set of two differential values. For example, a vehicle may obtain an image from a phone camera and also a raw GPS reading (e.g., 37.689° N, 117.23° W) from the phone. The raw GPS coordinate 420 may be inaccurate. The localization system 310 may receive the image and the raw GPS coordinate 420, and process them using the trained machine-learning model 320. The output of the trained machine-learning model 320 may be a differential of 4.1° N, 5.722° W. Therefore, a more accurate GPS coordinate should be 41.789° N, 122.952° W. Although this disclosure describes calculating a particular GPS coordinate for a querying GPS coordinate and its associated image in a particular manner, this disclosure contemplates calculating any suitable GPS coordinate for any suitable querying GPS coordinate and its associated image in any suitable manner.

In particular embodiments, the disclosed localization system 310 herein may support a plurality of down-stream applications. As an example and not by way of limitation, when the transportation management system 130 receives a ride request from a user, it may match the request with a ride provider 140 based at least in part on the ETA for the ride provider 140 to arrive at the pick-up location of the user. A candidate ride provider's 140 vehicle may send images and associated raw GPS coordinates 420 to the localization system 310 residing with the transportation management system 130. The localization system 310 may then determine the lane-level location of the candidate ride provider's 140 vehicle. The transportation management system 130 may then use the location to compute the ETA for the candidate ride provider 140 to arrive at the pick-up location. If the ETA is below a pre-defined threshold value, the transportation management system 130 may match the ride request from the user with this candidate ride provider 140. Continuing with the previous example, the transportation management system 130 may further calculate a route for the ride provider 140 based on the location of the ride provider's 140 vehicle. The ride provider 140 may follow the navigation displaying the route to get to the pick-up location of the user. Although this disclosure describes particular examples of using the localization system for down-stream applications in a particular manner, this disclosure contemplates any suitable examples of using the localization system for any suitable down-stream applications in any suitable manner.

Figure 8:
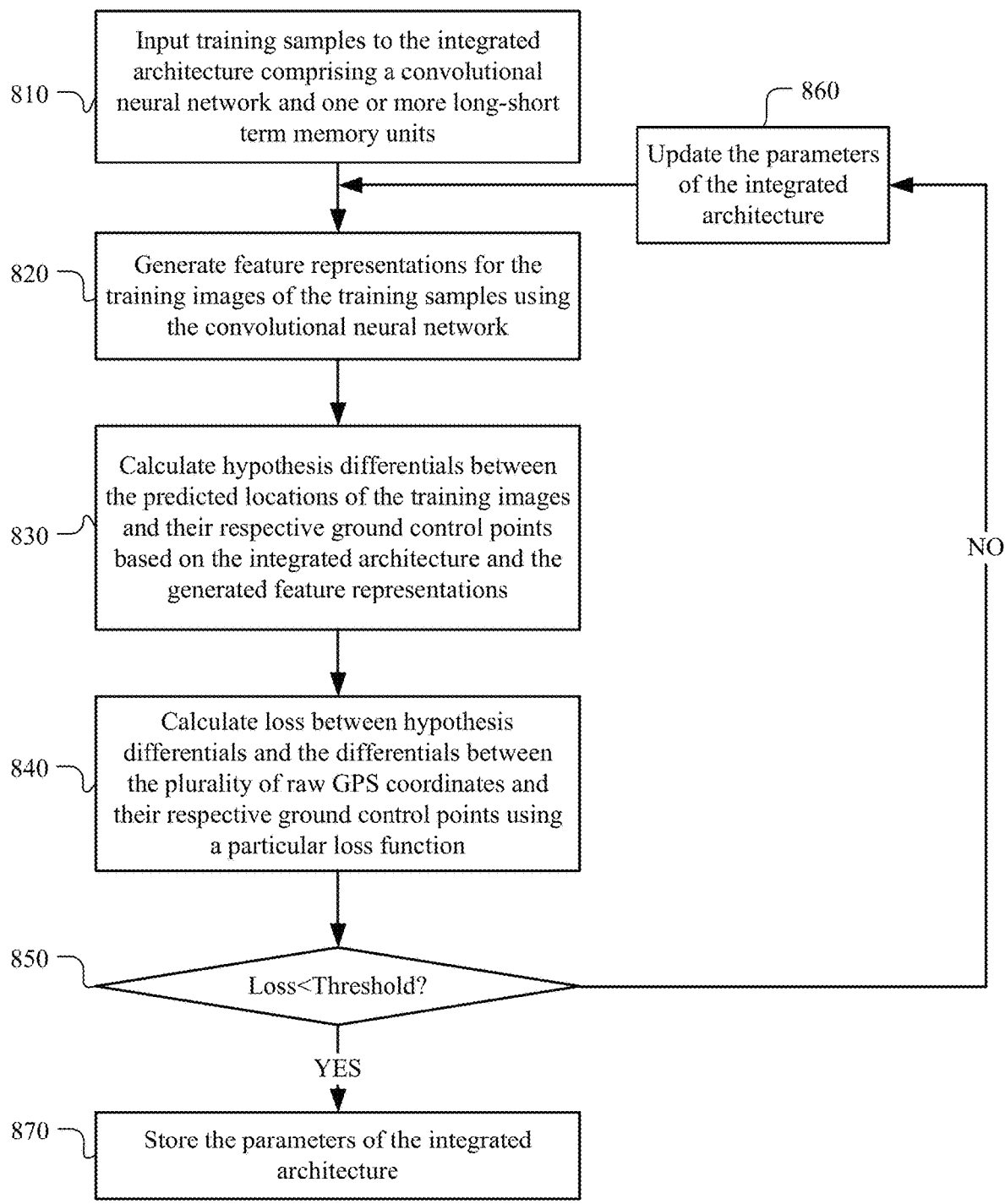
FIG. 8 illustrates an example flow diagram for training another machine-learning model using ground control points, according to particular embodiments.

FIG. 8 illustrates an example flow diagram 800 for training another machine-learning model 320 using ground control points 510, according to particular embodiments. In particular embodiments, the localization system 310 may train the machine-learning model 320 using a plurality of training samples 500. The plurality of training samples 500 may comprise: (1) a plurality of training images 410, (2) a plurality of raw GPS coordinates 420 associated with the plurality of training images 410, respectively, and (3) a plurality of ground control points 510 associated with a plurality of ground-truth GPS coordinates, respectively. The plurality of ground control points 510 may correspond to the plurality of training images 410, respectively. In particular embodiments, the localization system 310 may start training the machine-learning model 320 at step 810. At step 810, the localization system 310 may input a plurality of training samples 500 to the integrated architecture 600. The integrated architecture 600 may comprise a CNN 610 and one or more LSTM 620. At step 820, the localization system 310 may use the CNN 610 to process the plurality of training images 410 of the plurality of training samples 500 and generate a plurality of feature representations for the plurality of training images 410, respectively. At step 830, the localization system 310 may use the integrated architecture 600 to calculate a plurality of hypothesis differentials between the plurality of predicted locations of the plurality training images 410 and their respective ground control points 510 based on the integrated architecture 600 and the generated feature representations of the plurality of training images 410. At step 840, the localization system 310 may calculate loss between the plurality of hypothesis differentials and the differentials between the raw GPS coordinates 420 and their respective ground control points 510 using a particular loss function. As an example and not by way of limitation, the loss function may comprise a smooth L1 loss function. At step 850, the localization system 310 may evaluate if the overall loss is smaller than a pre-defined threshold value. If the overall loss is not smaller than the pre-defined threshold value, the localization system 310 may proceed to step 860. At step 860, the localization system 310 may update the parameters of the integrated architecture 600, which may result in an updated integrated architecture 600 accordingly. Then the localization system 310 may repeat step 820 through step 850. If the overall loss is smaller than the pre-defined threshold value, the localization system 310 may proceed to step 870. At step 870, the localization system 310 may store the parameters of the integrated architecture 600 and end the training. Although this disclosure describes a particular flow diagram for learning a particular machine-learning model in a particular manner, this disclosure contemplates any suitable flow diagram for learning any suitable machine-learning model in any suitable manner.

In particular embodiments, the localization system 310 may receive only a querying image of a ground scene obtained by sensors of a vehicle and determine the location of the vehicle based on the querying image without a corresponding raw GPS coordinate 420. The localization system 310 may first generate a feature representation for the querying image by processing the querying image using a machine-learning model 320 trained based on the flow diagram 800. The localization system 310 may then identify a possible ground control point 510 nearby based on a content analysis of the querying image. As an example and not by way of limitation, the ground control point 510 nearby may be a landmark building (e.g., City Hall of San Francisco), a particular shop (e.g., a coffee shop at a particular location) or any suitable entity. As the identified ground control point 510 may usually have a known ground-truth GPS coordinate, the localization system 310 may use the known ground-truth GPS coordinate as a reference GPS coordinate 430. The localization system 310 may then calculate a differential between the location of the vehicle and the identified ground control point 510 nearby. The localization system 310 may further calculate the adjusted GPS coordinate for the vehicle based on the ground-truth GPS coordinate of the ground control point 510 nearby and the differential between the vehicle and the ground control point 510. For example, a vehicle may obtain an image from a dash camera in the vehicle. The localization system 310 may receive the image and perform a content analysis on the image. The localization system 310 may identify that the image contains visual information of City Hall of San Francisco. As a result, the localization system 310 may determine City Hall of San Francisco as a ground control point 510 nearby. The ground-truth GPS coordinate of City Hall of San Francisco may be 37.779° N, −122.419° W. The localization system 310 may determine the differential between the vehicle and City Hall of San Francisco. Subsequently, the localization system 310 may calculate a more accurate GPS coordinate based on the differential and the GPS coordinate 37.779° N, −122.419° W. Although this disclosure describes calculating particular GPS coordinates for particular querying images in a particular manner, this disclosure contemplates calculating any suitable GPS coordinate for any suitable querying images in any suitable manner.

Figure 9:
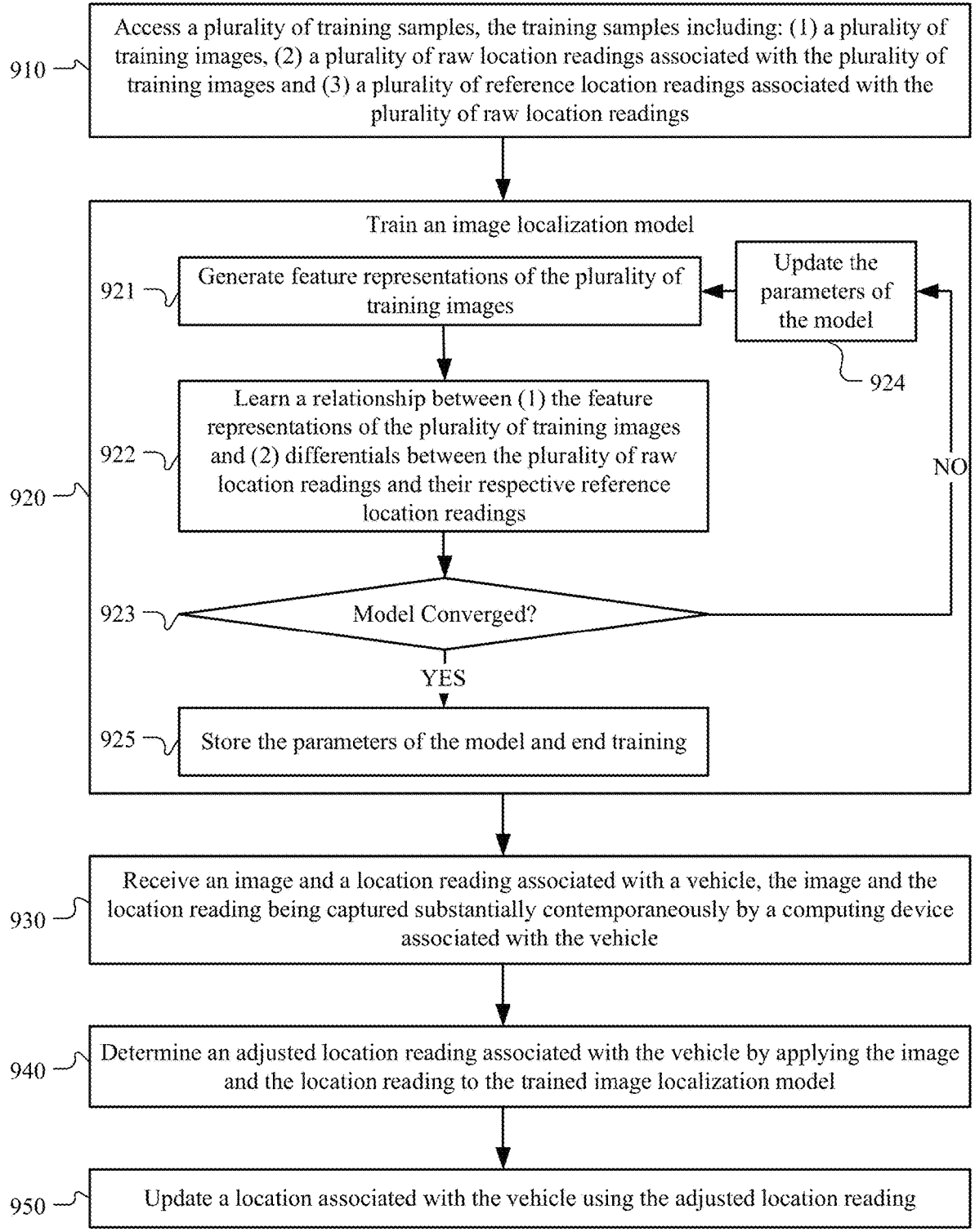
FIG. 9 illustrates an example method for determining an adjusted location reading associated with a vehicle.

FIG. 9 illustrates an example method 900 for determining an adjusted location reading associated with a vehicle. The method may begin at step 910. At step 910, a computing system may access a plurality of training samples 400. The training samples 400 may include: (1) a plurality of training images 410, (2) a plurality of raw location readings associated with the plurality of training images 410, respectively, and (3) a plurality of reference location readings associated with the plurality of raw location readings, respectively. At step 920, the computing system may train an image localization model. The training of step 920 may comprise the following sub-steps. At sub-step 921, the computing system may generate feature representations of the plurality of training images 410. At sub-step 922, the computing system may learn a relationship between (1) the feature representations of the plurality of training images 410 and (2) differentials between the plurality of raw location readings and their respective reference location readings. The learning may be based on the generated feature representations, the plurality of raw location readings, and the plurality of reference location readings. At sub-step 923, the computing system may evaluate if the model is converged. If the model is not converged, the computing system may proceed to sub-step 924. At sub-step 924, the computing system may update the parameters of the model and repeat sub-step 921 through sub-step 923. If the model is converged, the computing system may proceed to sub-step 925. At sub-step 925, the computing system may store the parameters of the model and end training. At step 930, the computing system may receive an image and a location reading associated with a vehicle. The image and the location reading may be captured substantially contemporaneously by a computing device associated with the vehicle. For example, the computing device may be a smart phone of the driver who is driving the vehicle. At step 940, the computing system may determine an adjusted location reading associated with the vehicle by applying the image and the location reading to the trained image localization model. At step 950, the computing system may update a location associated with the vehicle using the adjusted location reading. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining an adjusted location reading associated with a vehicle including the particular steps of the method of FIG. 9, this disclosure contemplates any suitable method for determining an adjusted location reading associated with a vehicle including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
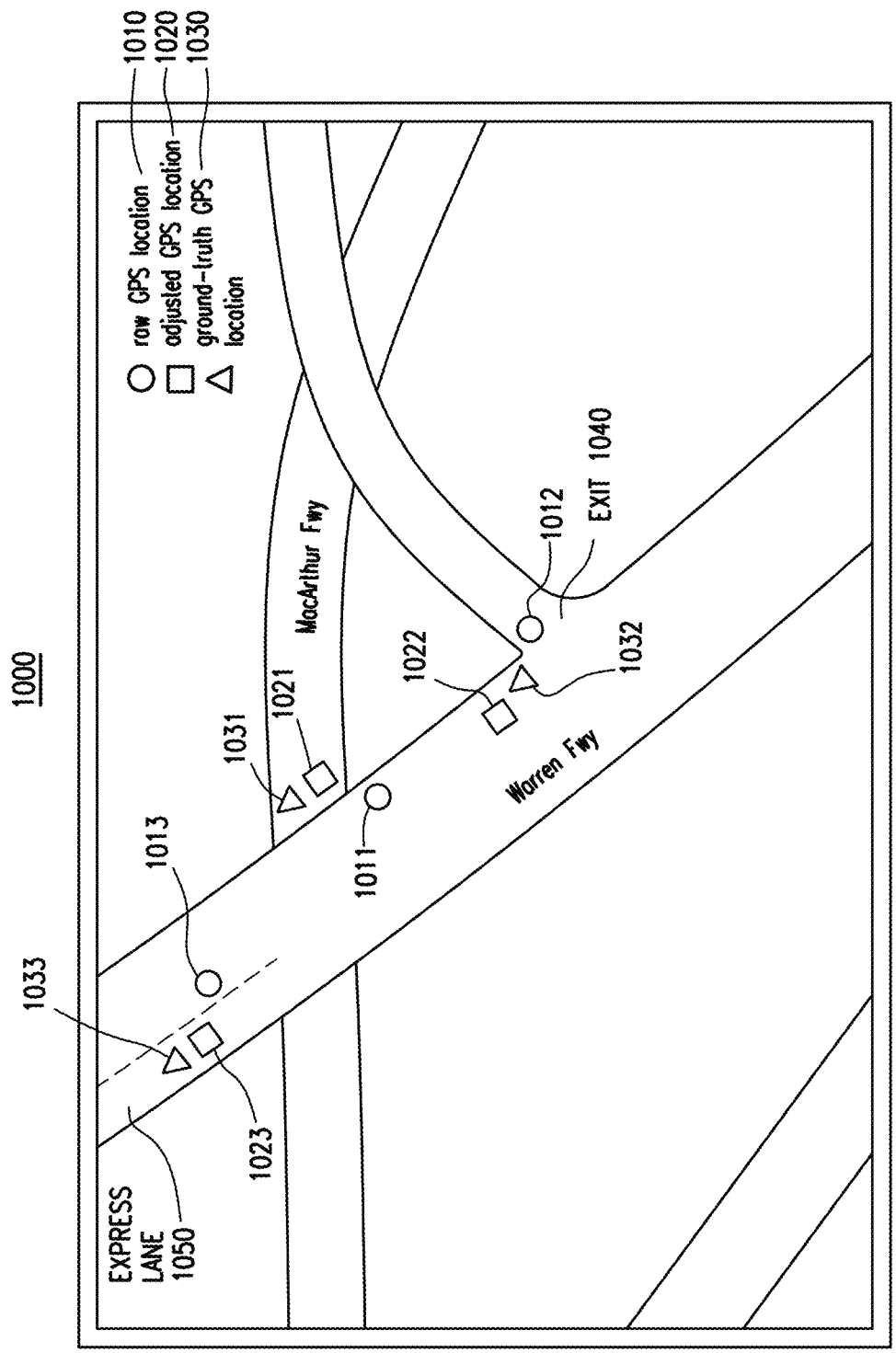
FIG. 10 illustrates an example comparison between raw GPS location, corresponding adjusted GPS location, and corresponding ground-truth GPS location.

FIG. 10 illustrates an example comparison between raw GPS location 1010, corresponding adjusted GPS location 1020, and corresponding ground-truth GPS location 1030. As illustrated in FIG. 10, adjusted GPS location 1020 determined by the disclosed localization system 310 may be more accurate than raw GPS location 1010 obtained from phone-grade GPS receivers. For example, a raw GPS location 1011 indicates that a vehicle is at Warren Freeway, which is errant. In fact, the vehicle is at MacArthur Freeway, as both the ground-truth GPS location 1031 and the adjusted GPS location 1021 indicate. By determining the right freeway that the vehicle is located at, the disclosed localization system 310 may calculate more accurate ETA and routing for the vehicle. As another example, a raw GPS location 1012 indicates that a vehicle got off Warren Freeway from exit 1040, which is errant. In fact, the vehicle is still on Warren Freeway, as both the ground-truth GPS location 1032 and the adjusted GPS location 1022 indicate. Using the errant determination that the vehicle got off the highway inevitably leads to wrong ETA and routing calculation. In contrast, the disclosed localization system 310 may calculate more accurate ETA and routing for the vehicle based on the fact that the vehicle is still at Warren Freeway. As another example, a raw GPS location 1013 indicates that a vehicle is at a regular lane of Warren Freeway, which is errant. In fact, the vehicle is at the express lane 1050, as both the ground-truth GPS location 1033 and the adjusted GPS location 1023 indicate. By detecting the accurate lane that the vehicle is in, the disclose localization system 310 may warn the driver of the vehicle if the vehicle is not registered for using express lanes, thereby helping the driver avoid a ticket. Although FIG. 10 illustrates a particular comparison between particular GPS locations in a particular manner, this disclosure contemplates any suitable comparison between any suitable GPS locations in any suitable manner.

Figure 11:
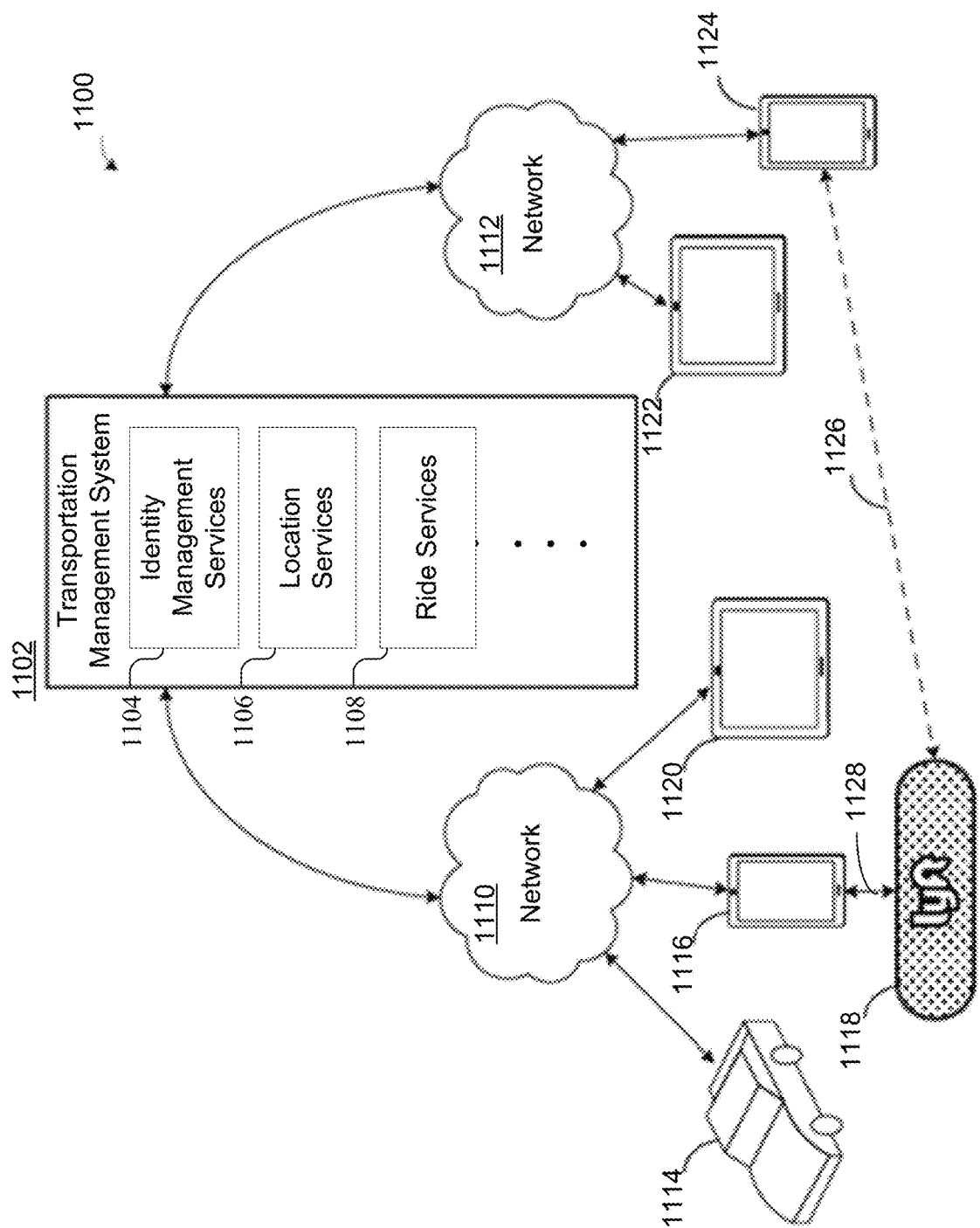
FIG. 11 illustrates an example block diagram of a transportation management environment.

FIG. 11 shows a transportation management environment 1100, in accordance with particular embodiments. For example, a transportation management system 1102 executing on one or more servers or distributed systems may be configured to provide various services to ride requestors and providers. In particular embodiments, the transportation management system 1102 may include software modules or applications, including, e.g., identity management services 1104, location services 1106, ride services 1108, and/or any other suitable services. Although a particular number of services are shown as being provided by system 1102, more or fewer services may be provided in various embodiments. In addition, although these services are shown as being provided by the system 1102, all or a portion of any of the services may be processed in a distributed fashion. For example, computations associated with a service task may be performed by a combination of the transportation management system 1102 (including any number of servers, databases, etc.), one or more devices associated with the provider (e.g., devices integrated with the managed vehicles 1114, provider's computing devices 1116 and tablets 1120, and transportation management vehicle devices 1118), and/or one or more devices associated with the ride requestor (e.g., the requestor's computing devices 1124 and tablets 1122). In particular embodiments, the transportation management system 1102 may include one or more general purpose computers, server computers, distributed computing systems, clustered computing systems, cloud-based computing systems, or any other computing systems or arrangements of computing systems. The transportation management system 1102 may be configured to run any or all of the services and/or software applications described herein. In particular embodiments, the transportation management system 1102 may include an appropriate operating system as well as various server applications, such as web servers capable of handling hypertext transport protocol (HTTP) requests, file transfer protocol (FTP) servers, database servers, etc.

In particular embodiments, identity management services 1104 may be configured to, e.g., perform authorization services for requestors and providers and manage their interactions and data with the transportation management system 1102. This may include, e.g., authenticating the identity of providers and determining that they are authorized to provide services through the transportation management system 1102. Similarly, requestors' identities may be authenticated to determine whether they are authorized to receive the requested services through the transportation management system 1102. Identity management services 1104 may also manage and control access to provider and requestor data maintained by the transportation management system 1102, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 1104 may also manage and control access to provider/requestor data stored with and/or obtained from third-party systems. For example, a requester or provider may grant the transportation management system 1102 access to a third-party email, calendar, or task management system (e.g., via the user's credentials). As another example, a requestor or provider may grant, through his/her mobile device (e.g., 1116, 1120, 1122, and 1124), a transportation application associated with the transportation management system 1102 access to data provided by other applications installed on the mobile device. Such data may be processed on the client and/or uploaded to the transportation management system 1102 for processing, if so desired.

In particular embodiments, the transportation management system 1102 may provide location services 1106, which may include navigation and/or traffic management services and user interfaces. For example, the location services 1106 may be responsible for querying devices associated with the provider (e.g., vehicle 1114, computing device 1116, tablet 1120, transportation management vehicle device 1118) and the requester (e.g., computing device 1124 and tablet 1122) for their locations. The location services 1106 may also be configured to track those devices to determine their relative proximities, generate relevant alerts (e.g., proximity is within a threshold distance), generate navigation recommendations, and any other location-based services.

In particular embodiments, the transportation management system 1102 may provide ride services 1108, which may include ride matching and management services to connect a requestor to a provider. For example, after the identity of a ride requestor has been authenticated by the identity management services module 1104, the ride services module 1108 may attempt to match the requestor with one or more ride providers. In particular embodiments, the ride services module 1108 may identify an appropriate provider using location data obtained from the location services module 1106. The ride services module 1108 may use the location data to identify providers who are geographically close to the requestor (e.g., within a certain threshold distance or travel time) and further identify those who are a good match with the requestor. The ride services module 1108 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 1108 may use rule-based algorithms or machine-learning models for matching requestors and providers.

The transportation management system 1102 may communicatively connect to various devices through networks 1110 and 1112. Networks 1110, 1112 may include any combination of interconnected networks configured to send and/or receive data communications using various communication protocols and transmission technologies. In particular embodiments, networks 1110, 1112 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 1110, 1112 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 1110, 1112 may each include any combination of networks described herein or known to one of ordinary skill in the art.

In particular embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, the transportation management vehicle device 1118 may be communicatively connected to the provider computing device 1116 and/or the requestor computing device 1124. The transportation management vehicle device 1118 may connect 1126, 1128 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 1102 using applications executing on their respective computing devices (e.g., 1114, 1116, 1118, and/or 1120), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 1114 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 1102. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 12:
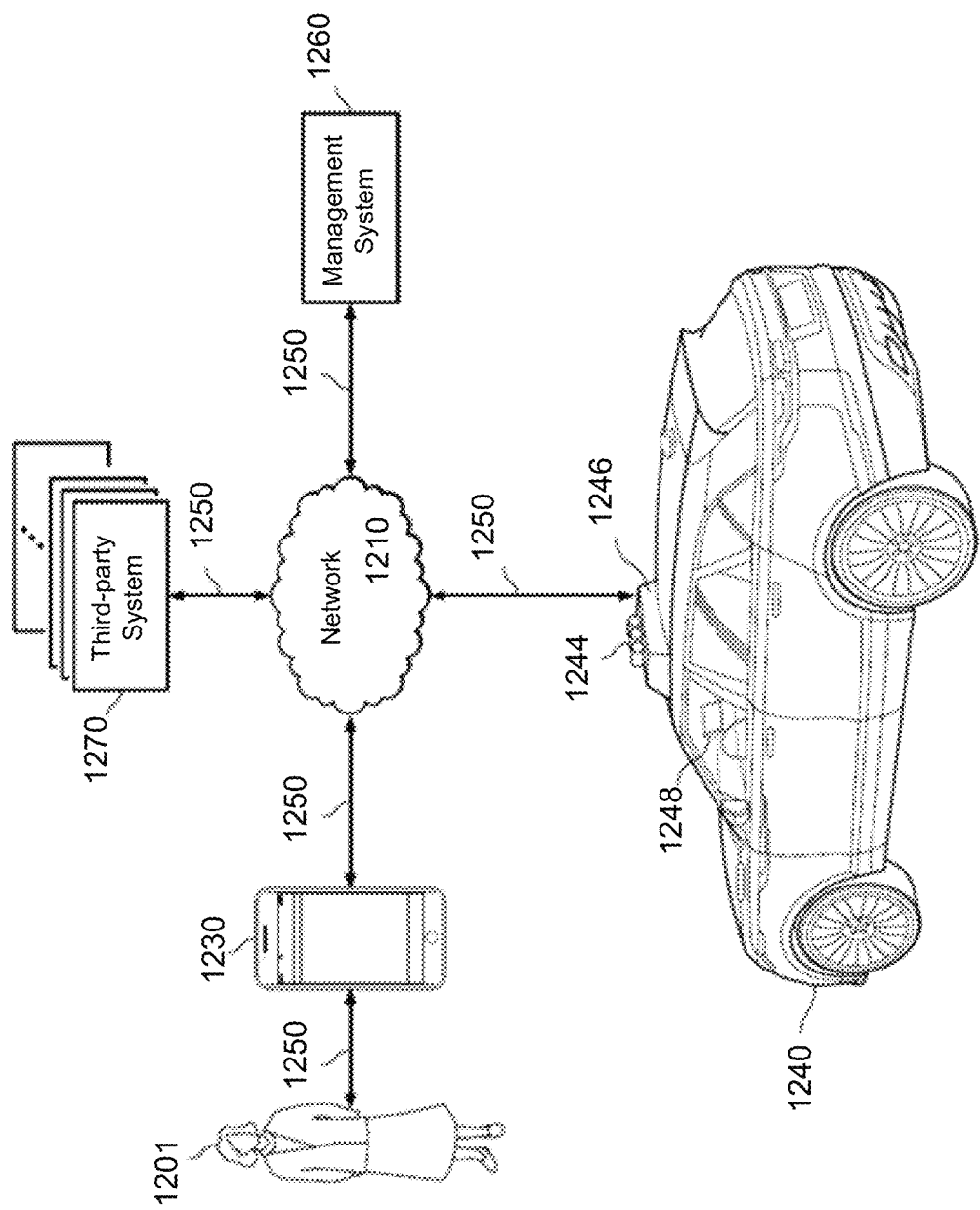
FIG. 12 illustrates an example block diagram of a transportation management environment for matching ride requestors with autonomous vehicles.

FIG. 12 illustrates an example block diagram of a transportation management environment for matching ride requestors with autonomous vehicles. In particular embodiments, the environment may include various computing entities, such as a user computing device 1230 of a user 1201 (e.g., a ride provider or requestor), a transportation management system 1260, an autonomous vehicle 1240, and one or more third-party system 1270. The computing entities may be communicatively connected over any suitable network 1210. As an example and not by way of limitation, one or more portions of network 1210 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 12 illustrates a single user device 1230, a single transportation management system 1260, a single vehicle 1240, a plurality of third-party systems 1270, and a single network 1210, this disclosure contemplates any suitable number of each of these entities. As an example and not by way of limitation, the network environment may include multiple users 1201, user devices 1230, transportation management systems 1260, autonomous-vehicles 1240, third-party systems 1270, and networks 1210.

The user device 1230, transportation management system 1260, autonomous vehicle 1240, and third-party system 1270 may be communicatively connected or co-located with each other in whole or in part. These computing entities may communicate via different transmission technologies and network types. For example, the user device 1230 and the vehicle 1240 may communicate with each other via a cable or short-range wireless communication (e.g., Bluetooth, NFC, WI-FI, etc.), and together they may be connected to the Internet via a cellular network that is accessible to either one of the devices (e.g., the user device 1230 may be a smartphone with LTE connection). The transportation management system 1260 and third-party system 1270, on the other hand, may be connected to the Internet via their respective LAN/WLAN networks and Internet Service Providers (ISP). FIG. 12 illustrates transmission links 1250 that connect user device 1230, autonomous vehicle 1240, transportation management system 1260, and third-party system 1270 to communication network 1210. This disclosure contemplates any suitable transmission links 1250, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1250 may connect to one or more networks 1210, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1250. For example, the user device 1230 may communicate with the transportation management system via a cellular network and the Internet, but communicate with the autonomous vehicle 1240 via Bluetooth or a physical wire connection.

In particular embodiments, the transportation management system 1260 may fulfill ride requests for one or more users 1201 by dispatching suitable vehicles. The transportation management system 1260 may receive any number of ride requests from any number of ride requestors 1201. In particular embodiments, a ride request from a ride requestor 1201 may include an identifier that identifies the ride requestor in the system 1260. The transportation management system 1260 may use the identifier to access and store the ride requestor's 1201 information, in accordance with his/her privacy settings. The ride requestor's 1201 information may be stored in one or more data stores (e.g., a relational database system) associated with and accessible to the transportation management system 1260. In particular embodiments, ride requestor information may include profile information about a particular ride requestor 1201. In particular embodiments, the ride requestor 1201 may be associated with one or more categories or types, through which the ride requestor 1201 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1260 may classify a user 1201 based on known information about the user 1201 (e.g., using machine-learning classifiers), and use the classification to retrieve relevant aggregate information associated with that class. For example, the system 1260 may classify a user 1201 as a young adult and retrieve relevant aggregate information associated with young adults, such as the type of music generally preferred by young adults.

Transportation management system 1260 may also store and access ride information. Ride information may include locations related to the ride, traffic data, route options, optimal pick-up or drop-off locations for the ride, or any other suitable information associated with a ride. As an example and not by way of limitation, when the transportation management system 1260 receives a request to travel from San Francisco International Airport (SFO) to Palo Alto, Calif., the system 1260 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason;

one or more routes to navigate from SFO to Palo Alto; preferred off-ramps for a type of user; or any other suitable information associated with the ride. In particular embodiments, portions of the ride information may be based on historical data associated with historical rides facilitated by the system 1260. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1260. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1260 in particular embodiments may predict and provide ride suggestions in response to a ride request. In particular embodiments, the system 1260 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1260 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1260 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1230 (which may belong to a ride requestor or provider), a transportation management system 1260, vehicle system 1240, or a third-party system 1270 to process, transform, manage, retrieve, modify, add, or delete the information stored in the data store.

In particular embodiments, transportation management system 1260 may include an authorization server (or any other suitable component(s)) that allows users 1201 to opt-in to or opt-out of having their information and actions logged, recorded, or sensed by transportation management system 1260 or shared with other systems (e.g., third-party systems 1270). In particular embodiments, a user 1201 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1201 of transportation management system 1260 through blocking, data hashing, anonymization, or other suitable techniques as appropriate.

In particular embodiments, third-party system 1270 may be a network-addressable computing system that may provide HD maps or host GPS maps, customer reviews, music or content, weather information, or any other suitable type of information. Third-party system 1270 may generate, store, receive, and send relevant data, such as, for example, map data, customer review data from a customer review website, weather data, or any other suitable type of data. Third-party system 1270 may be accessed by the other computing entities of the network environment either directly or via network 1210. For example, user device 1230 may access the third-party system 1270 via network 1210, or via transportation management system 1260. In the latter case, if credentials are required to access the third-party system 1270, the user 1201 may provide such information to the transportation management system 1260, which may serve as a proxy for accessing content from the third-party system 1270.

In particular embodiments, user device 1230 may be a mobile computing device such as a smartphone, tablet computer, or laptop computer. User device 1230 may include one or more processors (e.g., CPU and/or GPU), memory, and storage. An operating system and applications may be installed on the user device 1230, such as, e.g., a transportation application associated with the transportation management system 1260, applications associated with third-party systems 1270, and applications associated with the operating system. User device 1230 may include functionality for determining its location, direction, or orientation, based on integrated sensors such as GPS, compass, gyroscope, or accelerometer. User device 1230 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1230 may also include one or more cameras, scanners, touchscreens, microphones, speakers, and any other suitable input-output devices.

In particular embodiments, the vehicle 1240 may be an autonomous vehicle and equipped with an array of sensors 1244, a navigation system 1246, and a ride-service computing device 1248. In particular embodiments, a fleet of autonomous vehicles 1240 may be managed by the transportation management system 1260. The fleet of autonomous vehicles 1240, in whole or in part, may be owned by the entity associated with the transportation management system 1260, or they may be owned by a third-party entity relative to the transportation management system 1260. In either case, the transportation management system 1260 may control the operations of the autonomous vehicles 1240, including, e.g., dispatching select vehicles 1240 to fulfill ride requests, instructing the vehicles 1240 to perform select operations (e.g., head to a service center or charging/fueling station, pull over, stop immediately, self-diagnose, lock/unlock compartments, change music station, change temperature, and any other suitable operations), and instructing the vehicles 1240 to enter select operation modes (e.g., operate normally, drive at a reduced speed, drive under the command of human operators, and any other suitable operational modes).

In particular embodiments, the autonomous vehicles 1240 may receive data from and transmit data to the transportation management system 1260 and the third-party system 1270. Example of received data may include, e.g., instructions, new software or software updates, maps, 3D models, trained or untrained machine-learning models, location information (e.g., location of the ride requestor, the autonomous vehicle 1240 itself, other autonomous vehicles 1240, and target destinations such as service centers), navigation information, traffic information, weather information, entertainment content (e.g., music, video, and news) ride requestor information, ride information, and any other suitable information. Examples of data transmitted from the autonomous vehicle 1240 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1240, passengers may send/receive data to the transportation management system 1260 and/or third-party system 1270), and any other suitable data.

In particular embodiments, autonomous vehicles 1240 may also communicate with each other as well as other traditional human-driven vehicles, including those managed and not managed by the transportation management system 1260. For example, one vehicle 1240 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1260 or third-party system 1270).

In particular embodiments, an autonomous vehicle 1240 may obtain and process sensor/telemetry data. Such data may be captured by any suitable sensors. For example, the vehicle 1240 may have aa Light Detection and Ranging (LiDAR) sensor array of multiple LiDAR transceivers that are configured to rotate 360°, emitting pulsed laser light and measuring the reflected light from objects surrounding vehicle 1240. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1240. As an example and not by way of limitation, the 3D model may represent the external environment including objects such as other cars, curbs, debris, objects, and pedestrians up to a maximum range of the sensor arrangement (e.g., 50, 120, or 200 meters). As another example, the autonomous vehicle 1240 may have optical cameras pointing in different directions. The cameras may be used for, e.g., recognizing roads, lane markings, street signs, traffic lights, police, other vehicles, and any other visible objects of interest. To enable the vehicle 1240 to "see" at night, infrared cameras may be installed. In particular embodiments, the vehicle may be equipped with stereo vision for, e.g., spotting hazards such as pedestrians or tree branches on the road. As another example, the vehicle 1240 may have radars for, e.g., detecting other vehicles and/or hazards afar. Furthermore, the vehicle 1240 may have ultrasound equipment for, e.g., parking and obstacle detection. In addition to sensors enabling the vehicle 1240 to detect, measure, and understand the external world around it, the vehicle 1240 may further be equipped with sensors for detecting and self-diagnosing the vehicle's own state and condition. For example, the vehicle 1240 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1240 may build a 3D model of its surrounding based on data from its LiDAR, radar, sonar, and cameras, along with a pre-generated map obtained from the transportation management system 1260 or the third-party system 1270. Although sensors 1244 appear in a particular location on autonomous vehicle 1240 in FIG. 12, sensors 1244 may be located in any suitable location in or on autonomous vehicle 1240. Example locations for sensors include the front and rear bumpers, the doors, the front windshield, on the side panel, or any other suitable location.

In particular embodiments, the autonomous vehicle 1240 may be equipped with a processing unit (e.g., one or more CPUs and GPUs), memory, and storage. The vehicle 1240 may thus be equipped to perform a variety of computational and processing tasks, including processing the sensor data, extracting useful information, and operating accordingly. For example, based on images captured by its cameras and a machine-vision model, the vehicle 1240 may identify particular types of objects captured by the images, such as pedestrians, other vehicles, lanes, curbs, and any other objects of interest.

In particular embodiments, the autonomous vehicle 1240 may have a navigation system 1246 responsible for safely navigating the autonomous vehicle 1240. In particular embodiments, the navigation system 1246 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1246 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1246 may use its determinations to control the vehicle 1240 to operate in prescribed manners and to guide the autonomous vehicle 1240 to its destinations without colliding into other objects. Although the physical embodiment of the navigation system 1246 (e.g., the processing unit) appears in a particular location on autonomous vehicle 1240 in FIG. 12, navigation system 1246 may be located in any suitable location in or on autonomous vehicle 1240. Example locations for navigation system 1246 include inside the cabin or passenger compartment of autonomous vehicle 1240, near the engine/battery, near the front seats, rear seats, or in any other suitable location.

In particular embodiments, the autonomous vehicle 1240 may be equipped with a ride-service computing device 1248, which may be a tablet or any other suitable device installed by transportation management system 1260 to allow the user to interact with the autonomous vehicle 1240, transportation management system 1260, other users 1201, or third-party systems 1270. In particular embodiments, installation of ride-service computing device 1248 may be accomplished by placing the ride-service computing device 1248 inside autonomous vehicle 1240, and configuring it to communicate with the vehicle 1240 via a wire or wireless connection (e.g., via Bluetooth). Although FIG. 12 illustrates a single ride-service computing device 1248 at a particular location in autonomous vehicle 1240, autonomous vehicle 1240 may include several ride-service computing devices 1248 in several different locations within the vehicle. As an example and not by way of limitation, autonomous vehicle 1240 may include four ride-service computing devices 1248 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1248 may be detachable from any component of autonomous vehicle 1240. This may allow users to handle ride-service computing device 1248 in a manner consistent with other tablet computing devices. As an example and not by way of limitation, a user may move ride-service computing device 1248 to any location in the cabin or passenger compartment of autonomous vehicle 1240, may hold ride-service computing device 1248 in his/her lap, or handle ride-service computing device 1248 in any other suitable manner. Although this disclosure describes providing a particular computing device in a particular manner, this disclosure contemplates providing any suitable computing device in any suitable manner.

Figure 13:
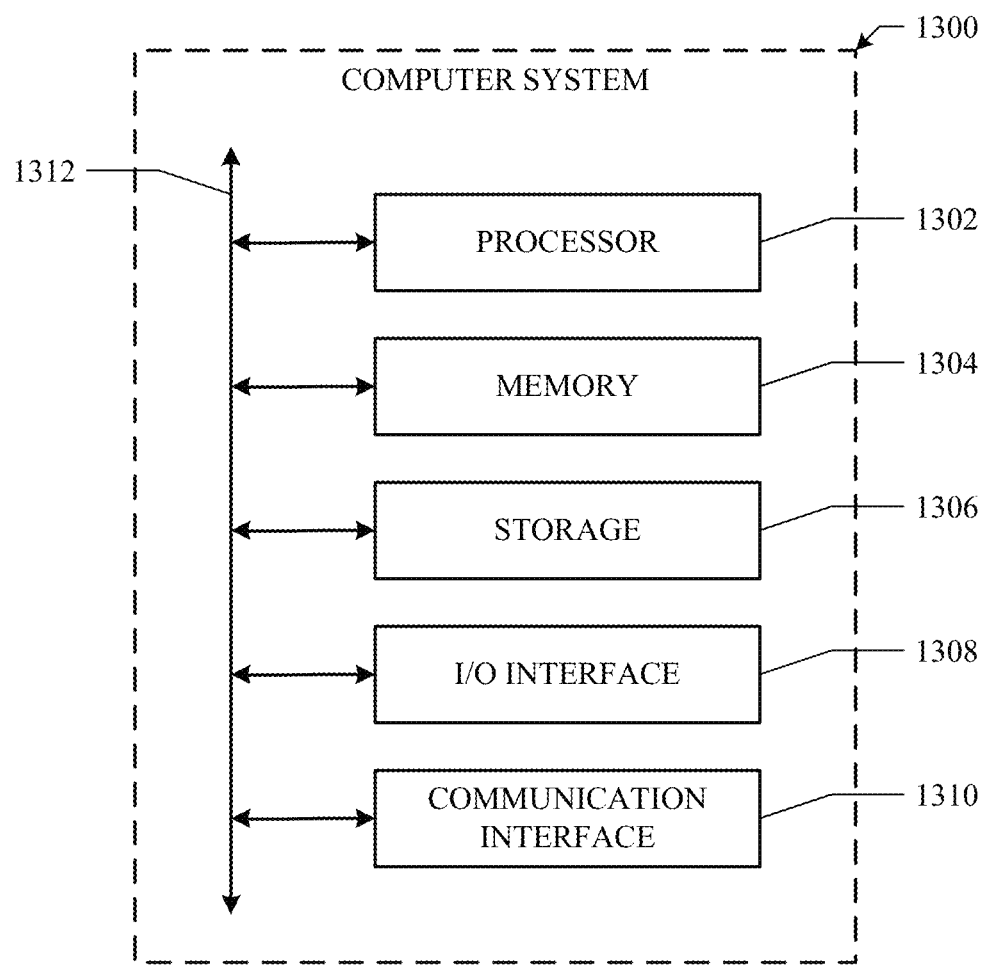
FIG. 13 illustrates an example of a computing system.

FIG. 13 illustrates an example computer system 1300. In particular embodiments, one or more computer systems 1300 perform one or more steps of one or more methods described or illustrated herein. In particular embodiments, one or more computer systems 1300 provide the functionalities described or illustrated herein. In particular embodiments, software running on one or more computer systems 1300 performs one or more steps of one or more methods described or illustrated herein or provides the functionalities described or illustrated herein. Particular embodiments include one or more portions of one or more computer systems 1300. Herein, a reference to a computer system may encompass a computing device, and vice versa, where appropriate. Moreover, a reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 that are to be operated on by computer instructions; the results of previous instructions executed by processor 1302 that are accessible to subsequent instructions or for writing to memory 1304 or storage 1306; or any other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs), be a multi-core processor, or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described in further detail below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving an image of a ground scene capturing an environment surrounding a vehicle operating in the environment, the image being captured by one or more sensors associated with the vehicle;
   generating a feature representation of the image;
   determining, based on the feature representation of the image, a potential ground control point corresponding to an object in the environment;
   determining a predetermined location reading associated with the potential ground control point;
   calculating a differential relative to the predetermined location reading associated with the potential ground control point; and
   determining, based on the differential and the predetermined location reading associated with the potential ground control point, a location of the vehicle.

2. The method of claim 1, further comprising:
   calculating an estimated time of arrival of the vehicle to arrive at a destination location based on the determined location of the vehicle.

3. The method of claim 1, further comprising:
   generating an adjusted location reading by combining the differential and the predetermined location reading, wherein the adjusted location reading corresponds to the location of the vehicle.

4. The method of claim 1, wherein calculating the differential is based on an image localization model trained based on a plurality of training images captured by one or more sensors associated with one or more vehicles.

5. The method of claim 4, wherein calculating the differential comprises:
   inputting the feature representation of the image and the predetermined location reading associated with the potential ground control point to the image localization model; and
   outputting, by the image localization model, a set of two differential values, corresponding to latitude and longitude respectively.

6. The method of claim 5, wherein determining the location of the vehicle comprises combining the predetermined location reading associated with the potential ground control point with the set of two differential values.

7. The method of claim 4, wherein each of the plurality of training images is associated with one or more of a raw location reading or a ground control point with a predetermined location reading.

8. The method of claim 4, further comprising training the image localization model by:
   generating feature representations of the plurality of training images, wherein the plurality of training images are respectively associated with a plurality of raw location readings and a plurality of ground control points; and
   learning a relationship between (1) the feature representations of the plurality of training images and (2) differentials between the plurality of raw location readings and a plurality of predetermined location readings for the plurality of ground control points.

9. The method of claim 8, wherein the relationship comprises a mapping function, and wherein calculating the differential comprises:
   inputting the feature representation of the image and the predetermined location reading based on the potential ground control point to the mapping function; and
   outputting, by the mapping function, the differential of a predicted hypothesis location reading and the predetermined location reading, wherein the differential comprises a set of two differential values corresponding to latitude and longitude respectively.

10. The method of claim 4, wherein the image localization model is based on a machine-learning architecture comprising a convolutional neural network, and wherein the feature representation of the image is processed by the convolutional neural network.

11. The method of claim 1, wherein the predetermined location reading associated with the potential ground control point comprise one or more of a GPS coordinate, a location reading determined based on speed, a location reading determined based on bearing, a location reading determined based on gyroscope rotation data, or a location reading determined based on one or more reference maps.

12. A system comprising: one or more processors and one or more computer-readable non-transitory storage media coupled to the one or more processors, the one or more computer-readable non-transitory storage media comprising instructions operable when executed by the one or more processors to cause the system to perform operations comprising:
receiving an image of a ground scene capturing an environment surrounding a vehicle operating in the environment, the image being captured by one or more sensors associated with the vehicle;
generating a feature representation of the image;
determining, based on the feature representation of the image, a potential ground control point corresponding to an object in the environment;
determining a predetermined location reading associated with the potential ground control point;
calculating a differential relative to the predetermined location reading associated with the potential ground control point; and
determining, based on the differential and the predetermined location reading associated with the potential ground control point, a location of the vehicle.

13. The system of claim 12, wherein the one or more computer-readable non-transitory storage media comprise instructions further operable when executed by the one or more processors to cause the system to perform operations comprising calculating an estimated time of arrival of the vehicle to arrive at a destination location based on the determined location of the vehicle.

14. The system of claim 12, wherein the one or more computer-readable non-transitory storage media comprise instructions further operable when executed by one or more of the processors to cause the system to perform operations comprising generating an adjusted location reading by combining the differential and the predetermined location reading, wherein the adjusted location reading corresponds to the location of the vehicle.

15. The system of claim 12, wherein calculating the differential is based on an image localization model trained based on a plurality of training images captured by one or more sensors associated with one or more vehicles.

16. The system of claim 15, wherein calculating the differential comprises:
inputting the feature representation of the image and the predetermined location reading associated with the potential ground control point to the image localization model; and
outputting, by the image localization model, a set of two differential values, corresponding to latitude and longitude respectively.

17. One or more computer-readable non-transitory storage media embodying instructions that are operable when executed to cause one or more processors to perform operations comprising:
receiving an image of a ground scene capturing an environment surrounding a vehicle operating in the environment, the image being captured by one or more sensors associated with the vehicle;
generating a feature representation of the image;
determining, based on the feature representation of the image, a potential ground control point corresponding to an object in the environment;
determining a predetermined location reading associated with the potential ground control point;
calculating a differential relative to the predetermined location reading associated with the potential ground control point; and
determining, based on the differential and the predetermined location reading associated with the potential ground control point, a location of the vehicle.

18. The media of claim 17, wherein the instructions are further operable when executed to cause the one or more processors to perform operations comprising calculating an estimated time of arrival of the vehicle to arrive at a destination location based on the determined location of the vehicle.

19. The media of claim 17, wherein the instructions are further operable when executed to cause the one or more processors to perform operations comprising generating an adjusted location reading by combining the differential and the predetermined location reading, wherein the adjusted location reading corresponds to the location of the vehicle.

20. The media of claim 17, wherein calculating the differential is based on an image localization model trained based on a plurality of training images captured by one or more sensors associated with one or more vehicles.

* * * * *